(12) United States Patent
Okanoue et al.

(10) Patent No.: US 6,272,410 B2
(45) Date of Patent: *Aug. 7, 2001

(54) ELECTRIC POWER STEERING SYSTEM

(75) Inventors: Takahiro Okanoue; Takayuki Kifuku, both of Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/271,294

(22) Filed: Mar. 17, 1999

(30) Foreign Application Priority Data

May 10, 1998 (JP) ................................... 10-283004

(51) Int. Cl.[7] .............................. B62D 1/00; B62D 5/00; G05D 1/00; G06F 7/00; G06F 17/00; G06F 19/00
(52) U.S. Cl. ................................ 701/42; 701/36; 701/41; 701/43; 180/416; 180/443; 180/404; 180/413; 180/446; 180/400; 318/140; 318/430; 318/432; 318/434; 318/469; 318/488; 388/811
(58) Field of Search ................. 701/42, 41, 43, 701/36; 180/416, 443, 404, 413, 446, 400; 318/432, 140, 430, 434, 488, 469; 340/650; 388/811, 907.5

(56) References Cited

U.S. PATENT DOCUMENTS

| 5,913,913 | * | 6/1999 | Okanoue et al. | 701/41 |
| 5,920,174 | * | 6/1999 | Kawada et al. | 318/663 |
| 5,982,137 | * | 11/1999 | Endo | 318/812 |
| 6,013,994 | * | 1/2000 | Endo et al. | 318/432 |

FOREIGN PATENT DOCUMENTS 7-137651    5/1995    (JP) .

* cited by examiner

Primary Examiner—William A. Cuchlinski, Jr.
Assistant Examiner—Ronnie Mancho
(74) Attorney, Agent, or Firm—Sughrue, Mion, Zinn, Macpeak & Seas, PLLC

(57) ABSTRACT

To keep low the cross frequency of current feedback control and provide a good steering feeling, a first operation expression is selected when a difference ξ between a current instruction value computed based on a steering state of a steering wheel and a traveling state of a vehicle and a motor drive current value supplied from a battery to a motor for providing assist force to a system for transmitting power from the steering wheel to the wheels is larger than a predetermined value Th1, a second operation expression is selected when the difference ξ is smaller than the predetermined value Th1, and the difference ξ is corrected using the selected operation expression.

20 Claims, 24 Drawing Sheets

ELECTRIC POWER STEERING SYSTEM

BACKGROUND OF THE INVENTION

1. Field of the Invention

The present invention relates to an electric power steering system for the current feedback control of a motor.

2. Description of the Prior Art

The electric power steering system of the prior art carries out current feedback control based on a difference between a current instruction value computed based on the steering state of a steering wheel and the travelling state of a vehicle and a motor drive current value supplied from a battery to a motor for providing assist force to a system for transmitting power from the steering wheel to the wheels, paying attention to the excellent controllability of output torque for the drive current of the motor. That is, the electric power steering system has been designed to ensure quick response for the controllability of the drive current of the motor as the current control characteristics of current feedback control so as to provide a good steering feeling.

In the current feedback control of the prior art, to ensure the response of current feedback control in order to give a good steering feeling to a driver, the gain of current feedback control is enhanced, the control range of a PID controller for current feedback control is widened, or further the response frequency of a current detection sensor is raised. However, these have the following defects.

When the gain of current feedback control is enhanced, there is an upper limit of the gain due to the control range of the PID controller, an internal response delay of a current detection circuit, or the like. When the gain exceeds the upper limit, in the loop transfer characteristics of current feedback control, both a gain margin and a phase margin decrease and the response of current feedback control becomes instable, whereby the motor drive current oscillates shortly. To prevent such inconvenience and optimize control response, it is desired that the phase margin of the loop transfer function of current feedback control should be set to 40 to 60° and the gain margin should be set to 10 to 20 dB. However, when the thus predetermined control characteristics of a controller, that is, the cross frequency of the loop transfer function of current feedback control is almost equal to the resonance frequency of a mechanical system, even if the loop transfer function of current feedback control itself is stable, a current oscillation triggered by mechanical resonance occurs, or a current oscillation is caused by a kind of induction phenomenon that the current oscillation induces torque oscillation or noise. This problem becomes marked when relatively large assist force is required for the motor, that is, when the motor stops while outputting a torque by stopping and holding the steering wheel at a turned position as in the case of turning the steering wheel while the vehicle stops, or when the rotation speed of the motor is extremely low by turning the steering wheel very slowly. Therefore, to prevent oscillation induced by the mechanical resonance frequency and the cross frequency of current feedback control, the cross frequency is made much lower than the resonance frequency of the mechanical system (that is, the gain of current feedback control is made small) to ensure the stability of current control at the sacrifice of the follow-up properties of current control, thereby preventing the oscillation of the output torque of the motor.

As alternative means of stabilizing the drive current control of the motor, it is conceivable to design current feedback control having quick response which can suppress current oscillation at the resonance frequency of the mechanical system without losing the follow-up properties of current control by making the cross frequency of current feedback control much higher than the resonance frequency of the mechanical system. However, to realize this means, the response range of the PID feedback controller must be widened. To this end, an extraordinary high-performance controller is required according to control specifications such as the response of torque control, for example, a high-speed CPU is required when the improvement of the response of hardware such as a current detection circuit and PID control are carried out by software. This is not wise for the construction of a system.

SUMMARY OF THE INVENTION

The present invention has been made to solve the above problem and it is an object of the present invention to provide an inexpensive electric power steering system which can provide a good steering feeling while keeping the cross frequency of current feedback control low and can prevent output torque oscillation and the generation of noise by setting the gain of current feedback control to a large value when the motor drive current must be controlled at quick response as in the case of a sudden change in current instruction value and to a low value when follow-up properties to the current instruction value are not required so much.

According to a first aspect of the present invention, there is provided an electric power steering system for carrying out current feedback control according to a difference between a current instruction value computed based on a steering state of a steering wheel and a traveling state of a vehicle and a motor drive current value supplied from a battery to a motor for providing assist force to a system for transmitting power from the steering wheel to the wheels, wherein the system has a first operation expression and a second operation expression as operation expressions for current feedback control, the first operation expression is selected when an index for selecting an operation expression is larger than a first predetermined value, the second operation expression is selected when the index is smaller than a second predetermined value, and the current feedback control is carried out by correcting the difference between the current instruction value and the current detection value using the selected operation expression.

According to a second aspect of the present invention, there is provided an electric power steering system, wherein the first predetermined value and the second predetermined value are equal to each other.

According to a third aspect of the present invention, there is provided an electric power steering system, wherein the product of the difference between the current instruction value and the motor drive current detection value and a first correction gain is obtained in the first operation expression and the product of the difference between the current instruction value and the motor drive current detection value and a second correction gain is obtained in the second operation expression.

According to a fourth aspect of the present invention, there is provided an electric power steering system, wherein a timer is provided to judge the index, the operation expression used for computation is switched to a first or second operation expression based on the judgment result of the index, and then the first or second operation expression is retained for a time set by the timer.

According to a fifth aspect of the present invention, there is provided an electric power steering system, wherein a timer is provided to judge the index, the first operation expression is selected when the index is judged to be larger than the first predetermined value for a predetermined time set by the timer and the second operation expression is selected when the index is judged to be smaller than the second predetermined value for a predetermined time set by the timer.

According to a sixth aspect of the present invention, there is provided an electric power steering system, wherein the difference between the current instruction value and the motor drive current detection value is represented by $\epsilon$, the first correction gain is represented by K1, the second correction gain is represented by K2, the predetermined value for judging the index is represented by C, ($\epsilon \times$K1) is used as the first operation expression when the absolute value of $\epsilon$ is smaller than the predetermined value C, and ($\xi \times$K2)—signs $\xi \times$C$\times$(K2−K1) is used as the second operation expression when the absolute value of $\epsilon$ is equal to or larger than the predetermined value C.

According to a seventh aspect of the present invention, there is provided an electric power steering system for carrying out current feedback control according to a difference between a current instruction value computed based on a steering state of a steering wheel and a traveling state of a vehicle and a motor drive current value supplied from a battery to a motor for providing assist force to a system for transmitting power from the steering wheel to the wheels, wherein an index for setting an operation expression for current feedback control is represented by I, a correction operation expression determined by this index I is represented by A(I), a controller for correcting the gain of current feedback control with A(I) is provided, and the correction operation expression A(I) includes a correction operation expression which satisfies dA(I)/dI≧0.

According to an eighth aspect of the present invention, there is provided an electric power steering system, wherein the absolute value of the difference between the current instruction value and the motor drive current detection value is used as the index.

According to a ninth aspect of the present invention, there is provided an electric power steering system, wherein the absolute value of the differential value of the current instruction value is used as the index.

According to a tenth aspect of the present invention, there is provided an electric power steering system, wherein the rotation speed of the motor is used as the index.

According to an eleventh aspect of the present invention, there is provided an electric power steering system, wherein a steering speed is used as the index.

According to a twelfth aspect of the present invention, there is provided an electric power steering system, wherein the back electromotive force of the motor is used as the index.

According to a thirteenth aspect of the present invention, there is provided an electric power steering system, wherein the absolute value of the differential value of the rotation speed of the motor is used as the index.

According to a fourteenth aspect of the present invention, there is provided an electric power steering system, wherein the absolute value of the differential value of the steering speed is used as the index.

According to a fifteenth aspect of the present invention, there is provided an electric power steering system, wherein the absolute value of the differential value of the back electromotive power of the motor is used as the index.

According to a sixteenth aspect of the present invention, there is provided an electric power steering system, wherein a steering torque detection value is used as the index.

According to a seventeenth aspect of the present invention, there is provided an electric power steering system, wherein the current instruction value is used as the index.

According to an eighteenth aspect of the present invention, there is provided an electric power steering system, wherein the motor drive current detection value is used as the index.

According to a nineteenth aspect of the present invention, there is provided an electric power steering system, wherein a car speed detection value is used as the index.

According to a twentieth aspect of the present invention, there is provided an electric power steering system, wherein a main circuit drives the motor based on the output of a feedback controller, and the gain of current feedback control is corrected to a correction gain which is specified based on a power voltage supplied to the main circuit.

The above and other objects, features and advantages of the invention will become more apparent from the following description when taken in conjunction with the accompanying drawings.

BRIEF DESCRIPTION OF THE ACCOMPANYING DRAWINGS

DETAILED DESCRIPTION OF THE PREFERRED EMBODIMENTS

Embodiment 1

Figure 1:
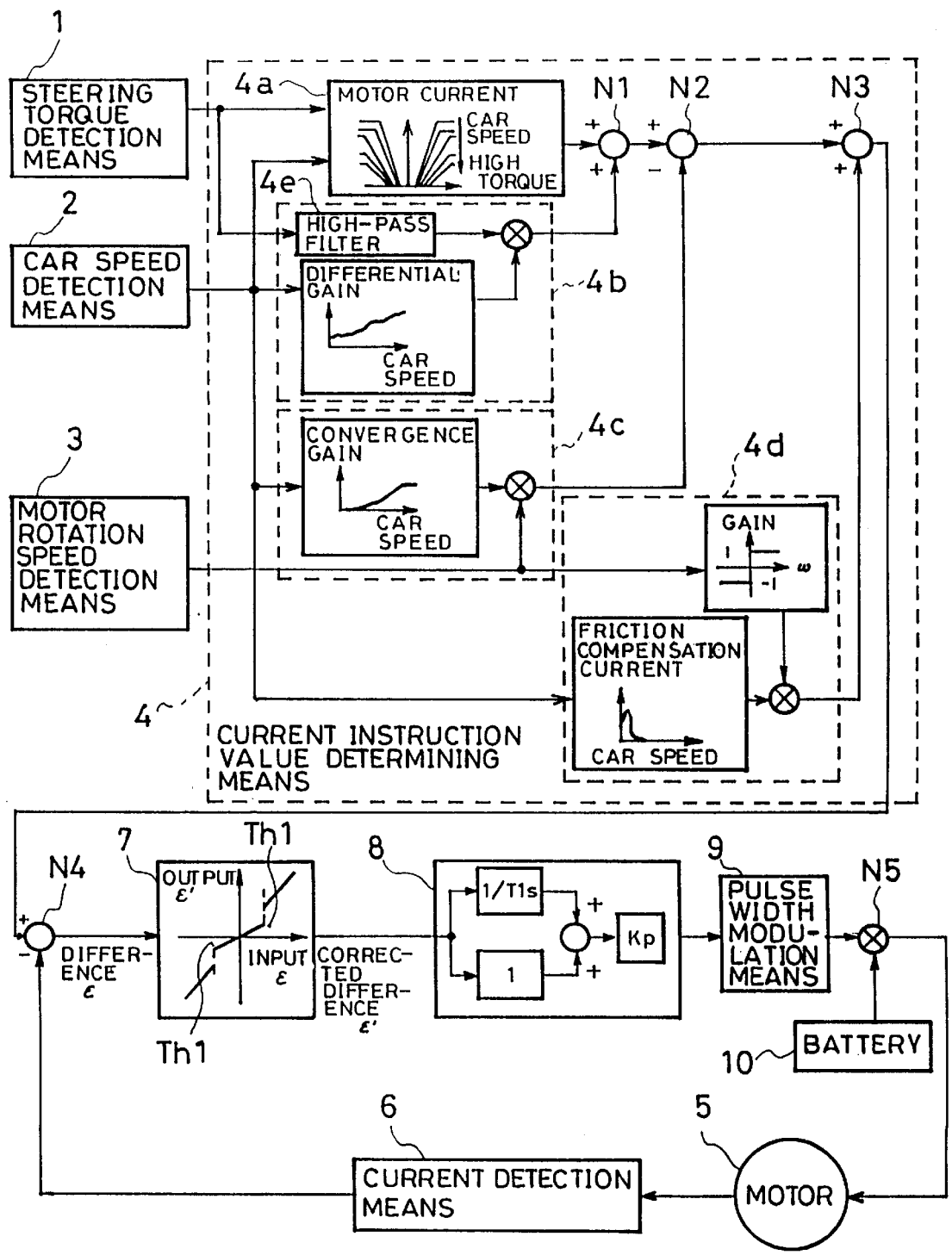
FIG. 1 is a block diagram showing a control unit and an input/output unit connected to the control unit of an electric power steering system according to Embodiment 1 of the present invention.

FIG. 1 is a block diagram showing a control unit and an input/output unit connected to the control unit of an electric power steering system according to Embodiment 1 of the present invention. In FIG. 1, reference numeral 1 denotes steering torque detection means, 2 car speed detection means, 3 motor rotation speed detection means, 4 current instruction value determining means, 5 motor, 6 current detection means, 7 feedback gain setting means, 8 PI controller, 9 pulse width modulation means and 10 battery. The steering torque detection means 1 detects force exerted by a driver for operating the steering wheel of a vehicle equipped with the electric power steering system as a steering torque, converts it into an electric signal and outputs the electric signal to the current instruction value determining means 4. The car speed detection means 2 detects the speed of the vehicle, converts it into an electric signal and outputs the electric signal to the current instruction value determining means 4. The motor rotation speed detection means 3 detects the rotation speed of the motor 5, converts it into an electric signal and outputs the electric signal to the current instruction value determining means 4. The current instruction determining means 4 determines a current instruction value as a control target for driving the motor 5 properly based on a steering torque detection value from the steering torque detection means 1, a car speed detection value from the car speed detection means 2 and a motor rotation speed detection value from the motor rotation speed detection means 3.

In Embodiment 1, the current instruction value determining means 4 comprises base current determining means 4a, differential control means 4b, convergence control means 4c and friction compensation current determining means 4d. The base current determining means 4a determines a motor current value as a base current required for the motor 5 to generate appropriate assist force based on a steering torque detection value from the steering torque detection means 1 and a car speed detection value from the car speed detection means 2. The differential control means 4b determines a differential gain based on a car speed detection value from the car speed detection means 2 to prevent the inertia moment of the motor 5 from affecting a steering feeling and obtains the product of the output of a high-pass filter 4e and the determined differential gain by causing a steering torque detection value from the steering torque detection means 1 to pass through the high-pass filter 4e.

The convergence control means 4c determines a convergence gain based on a car speed detection value from the car speed detection means 2 to improve the convergence of the steering wheel that it returns to a straight forward direction due to the alignment of the wheels and obtains the product of this convergence gain and a negative value of a motor rotation speed detection value from the motor rotation speed detection means 3 as a convergence compensation current value in a direction opposite to the rotation direction of the motor 5.

To compensate for deterioration in the returnability of the steering wheel caused by friction generated in the mechanical system such as a gear box for transmitting power to the axle from the steering wheel when the steering wheel is operated by the driver, the friction compensation current determining means 4d obtains a compensation gain "−1" or "1" from a motor rotation speed detection value from the motor rotation speed detection means 3, a friction compensation current value based on a car speed detection value from the car speed detection means 2, and the product of this friction compensation current value and the compensation gain. This compensation gain is determined as "−1" when the motor rotation speed detection means detects left direction motor rotation, and as "1" when the motor rotation speed detection means detects right direction motor rotation.

The current instruction value determining means 4 adds the motor current value obtained by the base current determining means 4a and the value obtained by the differential control means 4b, subtracts the convergence compensation current value obtained by the convergence control means 4c from the result of addition and adds the result of subtraction and the value obtained by the friction compensation current determining means 4d to determine a current instruction value and outputs this value to an node N4.

The motor 5 is an actuator for providing power for assisting the steering force of the driver to the steering wheel. The current detection means 6 detects a drive current to be supplied to the motor 5, converts it into an electric signal and feeds back the electric signal to the node N4. The node N4 computes a difference ξ between a current instruction value from the current instruction value determining means 4 and a motor drive current detection value from the current detection means 6 and outputs it to the current feedback gain setting means 7. The current feedback gain setting means 7 outputs to the PI controller 8 a corrected differences ξ' obtained by amplifying the difference ξ with a first correction gain K1 when the absolute value |ξ| of the difference ξ is smaller than a predetermined value and a corrected difference ξ' obtained by amplifying the difference ξ with a second correction gain K2 when the absolute value |ξ| of the difference ξ is equal to or larger than the predetermined value Th1.

The PI controller 8 obtains a current instruction value by adding a value which changes in proportion to the integral value of the corrected difference ξ' to proportional control (P control) for changing the current instruction value in proportion to the corrected difference ξ' from the feedback gain setting means 7 and executes PI control for outputting this current instruction value to the pulse width modulation means 9. The pulse width modulation means 9 converts the current instruction value from the PI controller 9 into a signal having a pulse width according to a predetermined carrier frequency and outputs it to an node N5. The node N5 generates a control current by amplifying the signal from the pulse width modulation means 9 with D-class power supplied from the battery 10 and supplies this generated control current to the motor 5.

Figure 2:
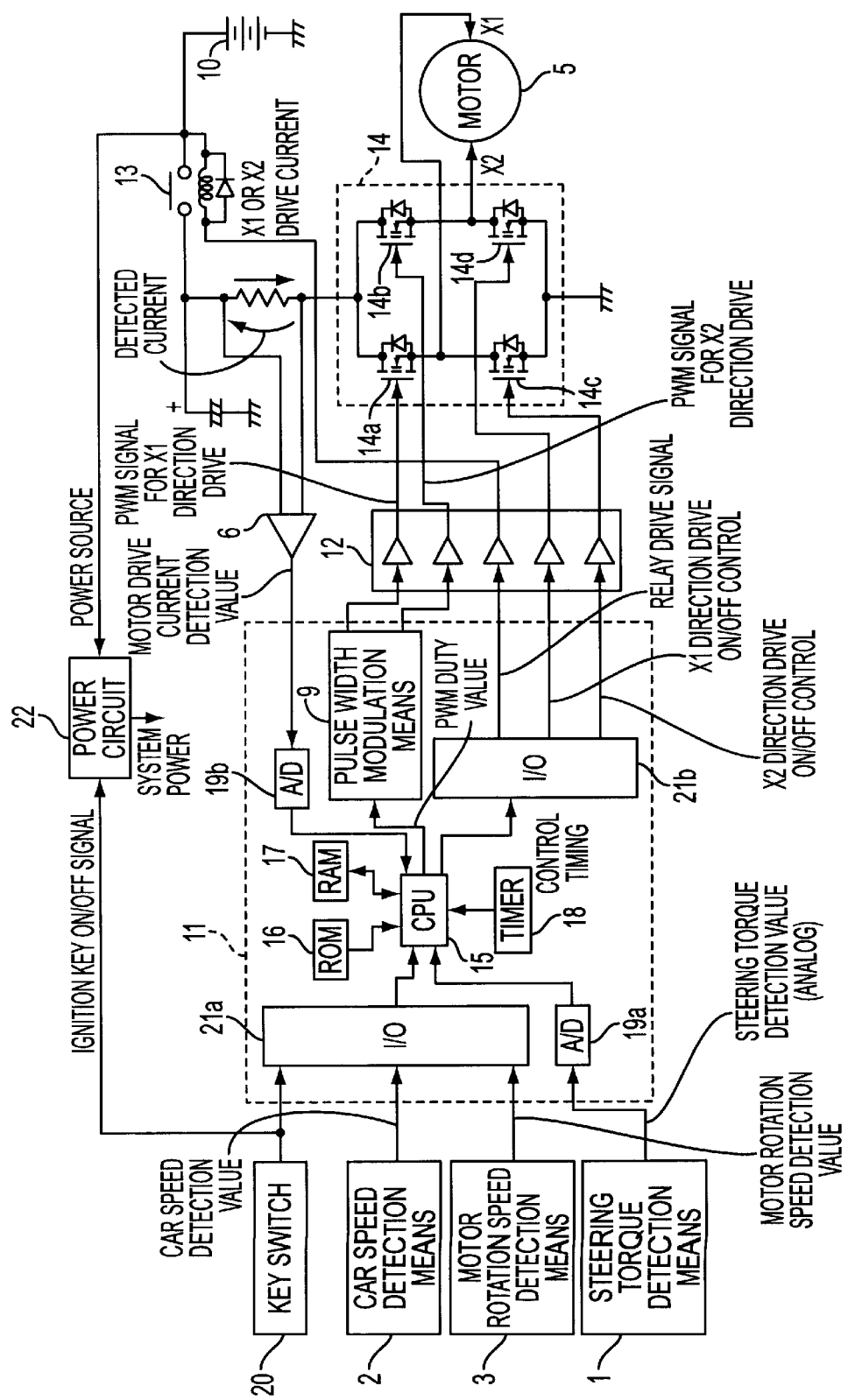
FIG. 2 is a block diagram showing the control unit and its peripheral circuits of the electric power steering system according to Embodiment 1 of the present invention.

FIG. 2 is a block diagram showing a control unit and its peripheral circuits of the electric power steering system according to Embodiment 1. Reference numeral 11 denotes a microcontroller which comprises a CPU 15, ROM 16, RAM 17 and timer 18. The CPU 15 starts the execution of arithmetic processing according to a program such as a control procedure or control characteristics stored in the ROM 16 each time it receives a start signal for the cycle of executing the program at predetermined intervals set by the timer 18 and executes the arithmetic processing of a flow chart shown in FIG. 3 using the RAM 17 as a temporary storage element for various data required for arithmetic processing. That is, the CPU 15, ROM 16 and RAM 17 are equivalent to the current instruction value determining means 4, the node N4, the current feedback gain setting means 7 and the PI controller 8 in FIG. 1.

The microcontroller 11 comprises pulse width modulation means 9, A/D converters 19a and 19b, and I/O ports 21a and 21b. The A/D converter 19a converts an analog signal corresponding to a steering torque detection value from the steering torque detection means 1 into a digital signal and outputs it to the CPU 15. The A/D converter 19b converts an analog signal corresponding to a motor drive current detection value from the current detection means 6 into a digital value and outputs it to the CPU 15. The pulse width modulation means 9 outputs a pulse width modulation (PWM) signal based on the operation result of the CPU 15 to a main circuit 14 for driving the motor 5 from a drive circuit 12. The I/O port 21a converts the operation signal of a key switch 20, a signal corresponding to a car speed detection value from the car speed detection means 2 and a signal corresponding to a motor rotation speed detection value from the motor rotation speed detection means 3 into signals usable by the CPU 15 and outputs these to the CPU 15. The I/O port 21b outputs the output signal of the CPU 15 to the drive circuit 12.

When the driver turns on the key switch 20, the microcontroller 11 and a power circuit 22 are activated, the microcontroller 11 carries out predetermined initial fault diagnosis and initialization, a relay 13 is closed by a signal from the microcontroller 11 through the drive circuit 12, and the motor 5 can be driven through the main circuit 14. In this state, the microcontroller 11 computes a current instruction value based on a steering torque detection value from the steering torque detection means 1, a car speed detection value from the car speed detection means 2 and a motor rotation speed detection value from the motor rotation speed detection means 3 and receives the feedback of a motor drive current detection value from the current detection means 6 to control an output torque generated in the motor 5.

A detailed description is subsequently given of the arithmetic processing of the CPU 15. The CPU 15 executes software prestored in the ROM 16 to carry out current feedback control so as to make the motor drive current equal to a current instruction value. The CPU 15 first computes a current instruction value for the current control cycle with reference to inputs from the steering torque detection means 1, the motor rotation speed detection means 2 and the car speed detection means 3 at each control cycle which is controlled to a predetermined cycle by the timer 18. The CPU 15 also refers to a motor drive current detection value from the current detection means 6 at each control cycle. The CPU 15 obtains the product of the difference ξ and the first correction gain K1 when the absolute value |ξ| of the difference ξ between the current instruction value and the motor drive current detection value is smaller than the predetermined value Th1 and the product of the difference ξ and the second correction gain K2 when the absolute value |ξ| of the difference ξ between the current instruction value and the motor drive current detection value is equal to or larger than the predetermined value Th1 in order to change the gain of current feedback control according to the difference ξ. Thereafter, the CPU 15 executes PI control to obtain PI control operation output as a drive duty for PWM control used by the main circuit 14. This PI control operation output is converted into a PWM signal required for the operation of the main circuit 14 by the pulse width modulation means 9 and the PWM signal is output to the drive circuit 12.

The CPU 15 outputs a motor current drive direction signal based on the drive direction of the current instruction value to the drive circuit 12 from the I/O port 21b. Thereby, the drive circuit 12 turns on or off the switching transistors 14a and 14b of the main circuit 14 in response to the PWM signal from the pulse width modulation means 9, and turns on or off the switching transistors 14c and 14d of the main circuit 14 in response to the motor current drive direction signal from the I/O port 21b. That is, when the switching transistor 14c of the main circuit 14 is turned off and the switching transistors 14a and 14d are both turned on, a current path is formed by the relay 13, the switching transistor 14a, the motor 5 and the switching transistor 14d, a motor drive current flows from the battery 10 to the motor 5 in a direction shown by an arrow X1, and the motor 5 rotates in one direction. On the contrary, when the switching transistor 14d of the main circuit 14 is turned off and the switching transistors 14b and 14c are both turned on, a current path is formed by the relay 13, the switching transistor 14b, the motor 5 and the switching transistor 14c, a motor drive current flows from the battery 10 to the motor 5 in a direction shown by X2, and the motor 5 rotates in a direction opposite to the above direction.

Figure 3:
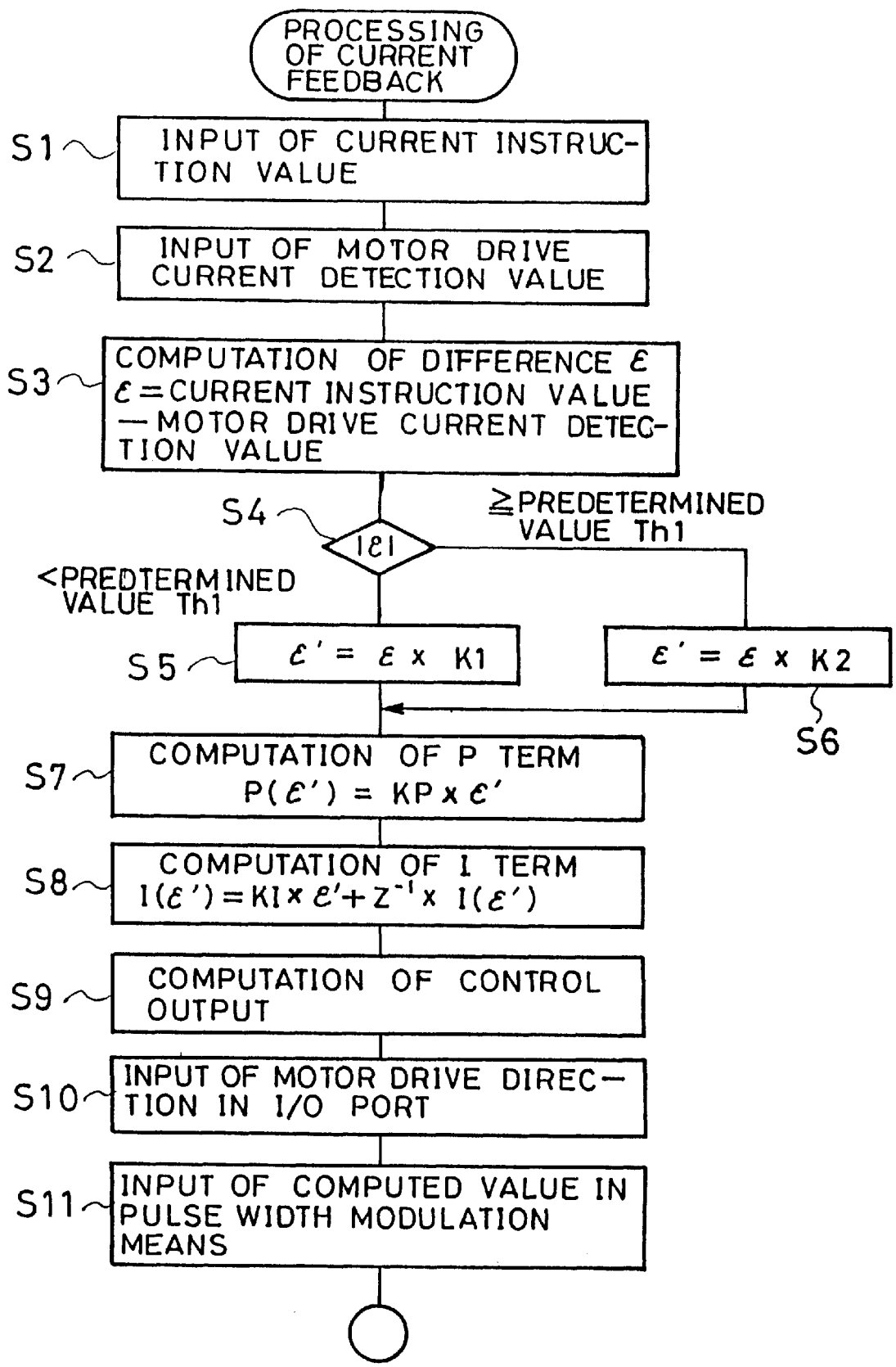
FIG. 3 is a flow chart of the current feedback control of the electric power steering system according to Embodiment 1 of the present invention.

The current feedback control of Embodiment 1 will be described with reference to the flow chart of FIG. 3. This current feedback control is requested and executed by the function of the timer 18 shown in FIG. 2 at each control cycle. The current instruction value is input in step S1, the motor drive current detection value is input in step S2, and the difference ξ between the current instruction value and the motor drive current detection value is obtained in step S3. The absolute value |ξ| of the difference ξ is compared with the predetermined value Th1 in step S4. When the absolute value |ξ| is smaller than the predetermined value Th1, the routine proceeds to step S5 and when the absolute value |ξ| is equal to or larger than the predetermined value Th1, the routine proceeds to step S6. Instep S5 or S6, the difference ξ obtained in step S3 is multiplied by the first correction gain K1 or the second correction gain K2 to obtain a corrected difference ξ'. In this respect, when K1 is larger than K2 and the absolute value |ξ| is larger than the predetermined value Th1, the corrected differences ξ' takes a large value. In step S7 or S8, the computations of a proportional term (P term) and an integral term (I term) are carried out on each corrected difference ξ'. In step S9, the total of the P term and the I term is obtained to find a pulse width for driving the main circuit 14. In step S10, a motor drive direction signal based on the direction of the current instruction value is applied to the main circuit 14 through the I/O port 21b and the drive circuit 12. In step S11, a computed value of the pulse width obtained in step S9 is set in the pulse width modulation means 9. Thereby, the pulse width modulation means 9 outputs a predetermined motor drive duty pulse in accordance with the result of the PI computations to the main circuit 14 through the drive circuit 12.

In this Embodiment 1, when the difference ξ between the current instruction value and the motor drive current detection value is smaller than the predetermined value Th1, a gain used for PI control is set to the first correction gain K1 and when the difference ξ is equal to or larger than the predetermined value Th1, the gain used for PI control is set to the second correction gain K2. Therefore, when the first correction gain K1 is made smaller than the second correction gain K2 and PI control is carried out on a motor drive current, if a time change in the current instruction value is mild, the motor 5 is driven while the difference ξ is maintained at almost "0" in accordance with the characteristics of the so-called I type control system of an automatic control theory as the PI control includes an integral term. If the time change in the current instruction value is radical, the motor current detection value cannot follow the change in the current instruction value quickly, and the difference ξ becomes larger than the predetermined value Th1 with the result that the gain of current feedback control is corrected with the second correction gain K2 and the current control of the motor 5 is continued.

Figure 4:
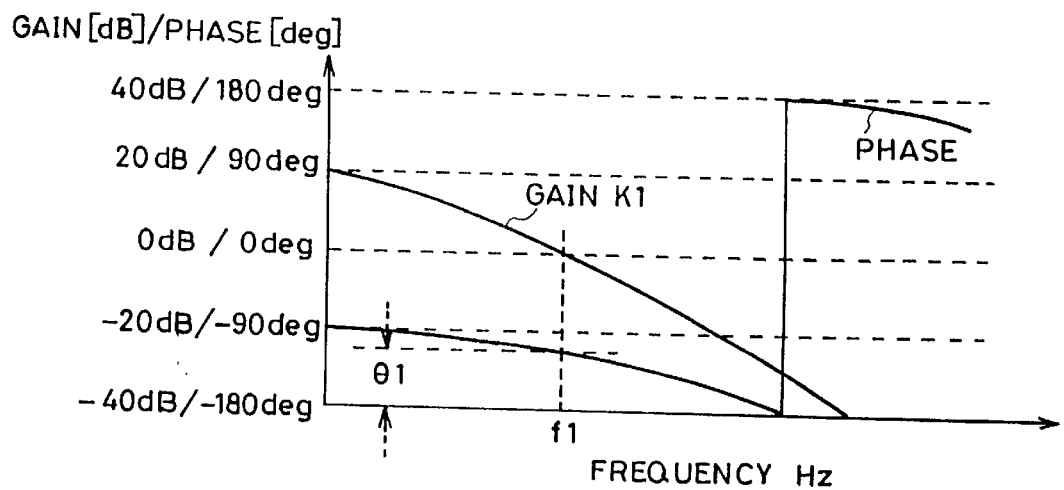
FIG. 4 is a diagram for explaining a loop transfer function of a current feedback loop when a first correction gain K1 is used in the electric power steering system according to Embodiment 1 of the present invention.
Figure 5:
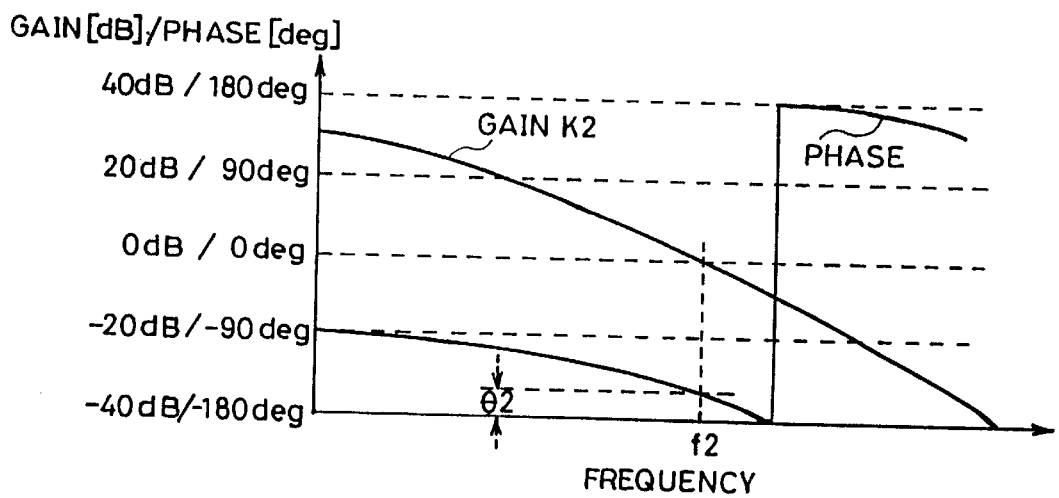
FIG. 5 is a diagram for explaining a loop transfer function of a current feedback loop when a second correction gain K2 is used in the electric power steering system according to Embodiment 1 of the present invention.

The loop transfer function of this current feedback control is illustrated in FIGS. 4 and 5. K1 is larger than K2 in FIGS. 4 and 5, FIG. 4 shows K1, and FIG. 5 shows K2. In FIG. 4, when the cross frequency is f1, the phase margin at this point is θ1. In FIG. 5, when the cross frequency is f2, the phase margin at this point is θ2. Thus, by changing the gain of the current feedback control by selecting the first correction gain K1 or the second correction gain K2, the cross frequency can be changed to f1 or f2. Thus, two control bandwidths can be selected.

As for the selection of the first correction gain K1 or the second correction gain K2 in Embodiment 1, for example, the first correction gain K1 is selected to reduce the cross frequency f1 as much as possible within limits that satisfy stationary response and the second correction gain K2 is selected to set the phase margin and the gain which are generally known as the thumb rules of automatic control to 40 to 60° and to 10 to 20 dB, respectively, so as to enhance follow-up properties to transient response. According to the electric power steering system in which the gain of current feedback control has been corrected, when the drive current of the motor 5 is in a stationary response state as in the case of turning the steering wheel and holding it at a turned position while the vehicle is stopped, the first correction gain K1 is selected as the gain of current feedback control, whereby the response of current feedback control to the motor 5 can be determined to ensure that response including the resonance of a mechanical system for transmitting power from the steering wheel to the axle should become stable. Meanwhile, since the drive current of the motor 5 is corrected with the second correction gain K2 larger than the first correction gain K1 even when transient response is required as in the case of turning the steering wheel quickly, quick response can be ensured.

Embodiment 2

Figure 6:
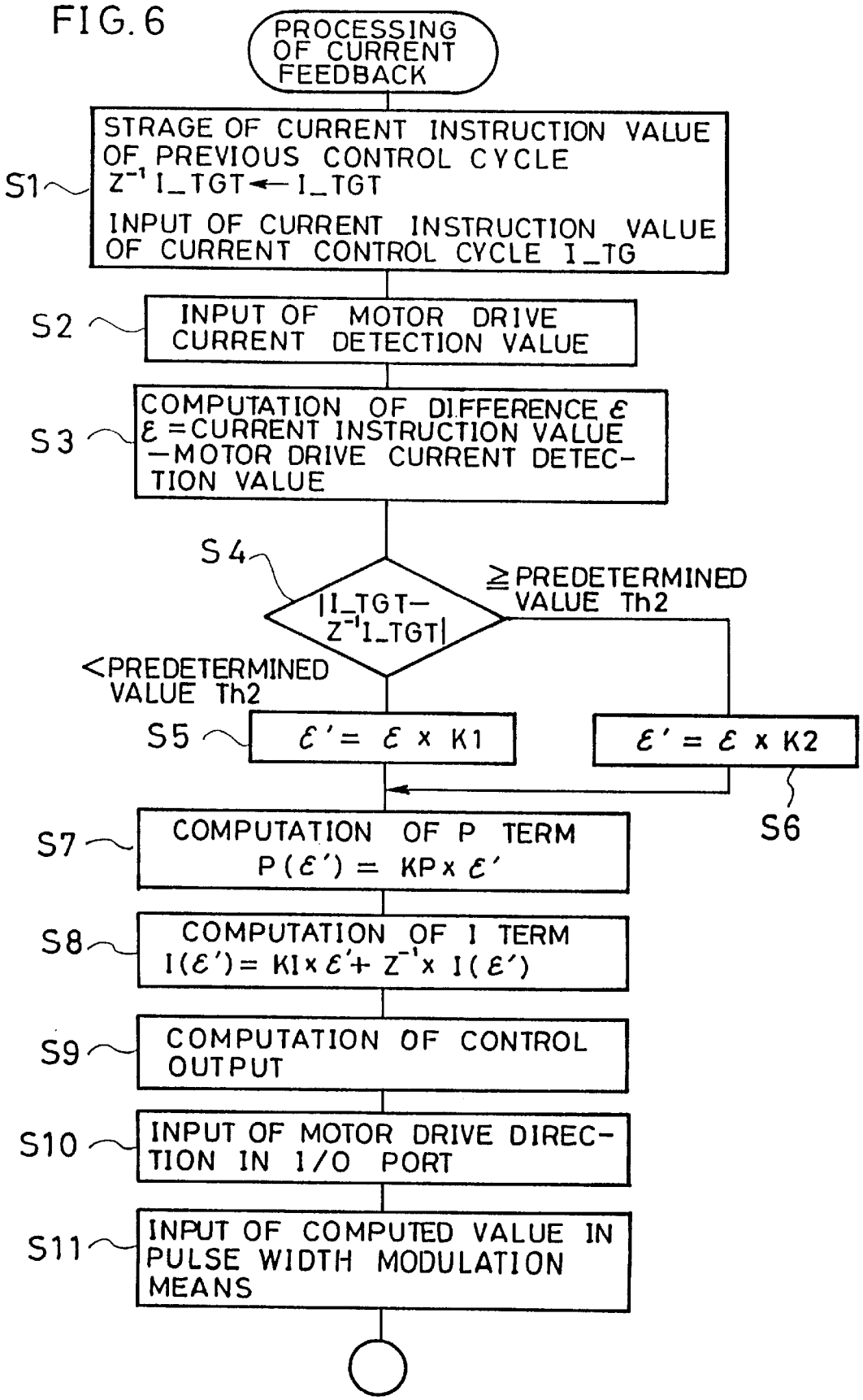
FIG. 6 is a flow chart of current feedback control of an electric power steering system according to Embodiment 2 of the present invention.

In the above Embodiment 1, the difference ξ between the current instruction value and the current detection value is used as an index for setting the gain of current feedback control. A differential value of the current instruction value may be used in place of the difference ξ. FIG. 6 is a flow chart of current feedback control in Embodiment 2. The flow chart of FIG. 6 differs from the flow chart of the FIG. 3 in the processings of step S1 and step S4. Therefore, only the processings and their functions will be described herein under. In step S1, a current instruction value I_TGT used in the previous control cycle is stored as a one sample delayed current instruction value Z_1I_TGT and then a current instruction value I_TGT in the current control cycle is input. In step S4, the absolute value |Z_1I_TGT−I_| TGT of the difference between the current instruction value Z_1I_TGT of the previous control cycle and the current instruction value I_TGT of the current control cycle is compared with a predetermined value Th2. When the absolute value |Z_1I_TGT−I_TGT| is smaller than the predetermined value Th2, the routine proceeds to step S5 and when the absolute value |Z_1I_TGT−I_TGT| is equal to or larger than the predetermined value Th2, the routine proceeds to step S6.

According to this constitution, when a change in the steering force of the driver is small, the gain of current feedback control is corrected to the first correction gain K1 and when the change in the steering force of the driver is large, the gain of current feedback control is corrected to the second correction gain K2. Therefore, by selecting appropriate values for the first correction gain K1 and the second correction gain K2, an electric power steering system which can achieve both stability and follow-up properties of current feedback control for the output torque of the motor 5 can be constructed easily with a simple structure like Embodiment 1. In Embodiment 2, the differential value of the output torque of the motor 5 is a value obtained by differentiating a torque sampling value at each control cycle by a rear difference with software. Alternatively, known differential processing with software using bilinear conversion, known differential processing with hardware such as an operational amplifier or the like may be applied.

Embodiment 3

Figure 8:
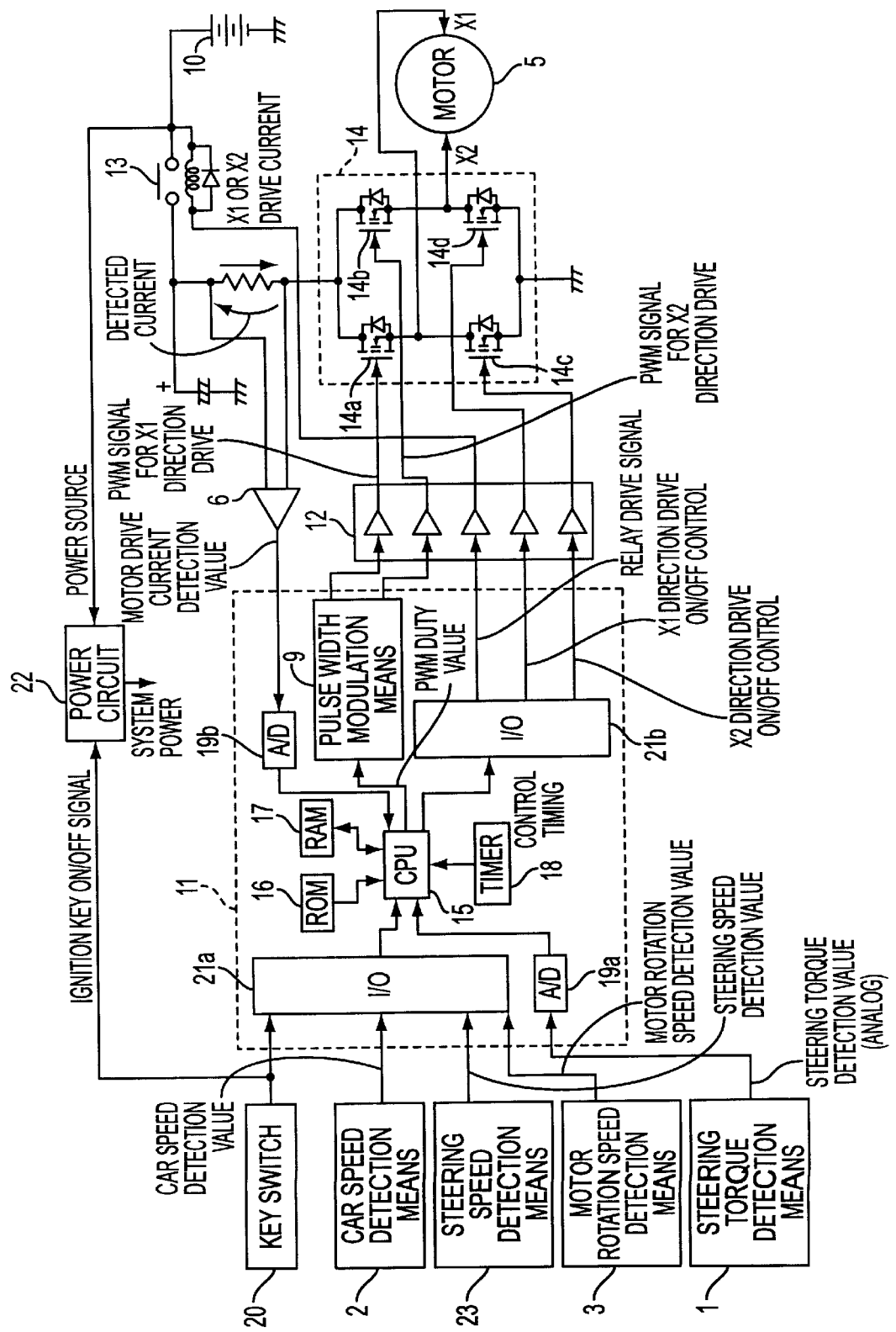
FIG. 8 is a block diagram showing the circuit configuration of the electric power steering system according to Embodiment 3 of the present invention.

To achieve both response when the steering wheel is turned and stability when the steering wheel is held, as shown in FIG. 8 which is a circuit block diagram of Embodiment 3, a steering speed detection value which is obtained by detecting the steering speed of a steering shaft system linked to the steering wheel by steering speed detection means 23, converted into an electric signal and applied to the CPU 15 through the I/O port 21a of the microcontroller 11 may be used as an index for switching the gain of current feedback control. That is, as described in Embodiments 1 and 2, the stabilization of current feedback control is required when the steering wheel is turned and stopped at a certain turned position and the follow-up properties of current feedback control are required while the steering wheel is turned rapidly by the driver. Therefore, the gain of current feedback control may be changed according to the steering speed detection value of the steering speed detection means 23.

Figure 7:
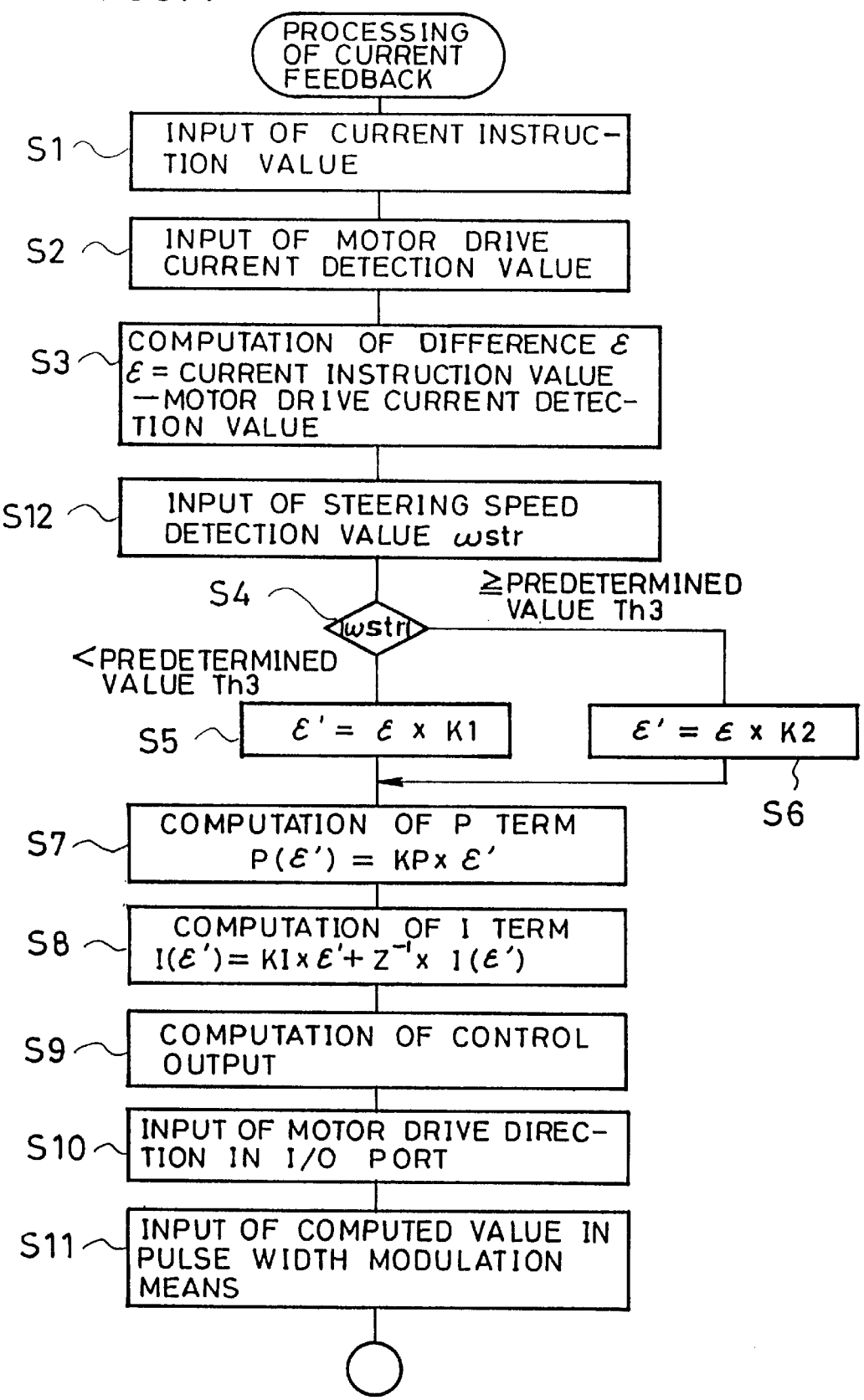
FIG. 7 is a flow chart of current feedback control of an electric power steering system according to Embodiment 3 of the present invention.

FIG. 7 is a flow chart of current feedback control in Embodiment 3. The flow chart of FIG. 7 differs from the flow chart of FIG. 3 in that step S12 is added and the index for switching the gain of current feedback control in step S4 is changed. These changes and their functions will be described hereinunder. In step S12, the steering speed detection value $\omega str$ of the steering speed detection means 23 is input. In step S4, the absolute value $|\omega str|$ of the steering speed detection value $\omega str$ is compared with a predetermined value Th3. When the absolute value $|\omega str|$ is smaller than the predetermined value Th3, the routine proceeds to step S5 and when the absolute value $|\omega str|$ is equal to or larger than the predetermined value Th3, the routine proceeds to step S6. As a result, the first correction gain K1 or the second correction gain K2 is suitably selected according to the steering speed and hence, an electric power steering system which achieves both stability and follow-up properties of current feedback control can be constructed easily with a simple structure. The steering speed detection means 23 may be an optical encoder, magnetic encoder or rotation sensor such as a resolver which can interface with the microcomputer comprising the CPU 15, ROM 16, RAM 17 and timer 18 shown in FIG. 1 with ease.

Embodiment 4

Figure 9:
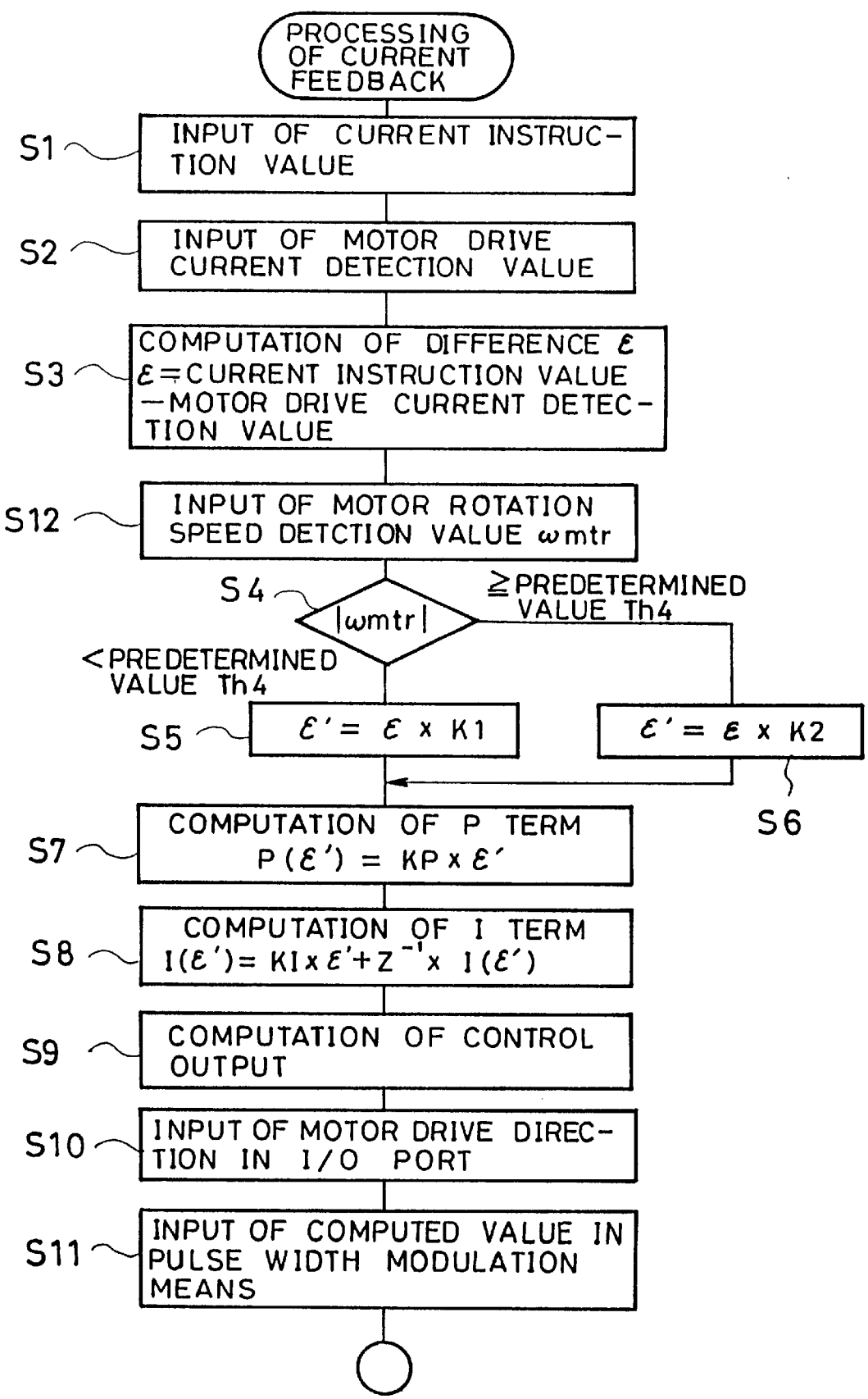
FIG. 9 is a flow chart of current feedback control of an electric power steering system according to Embodiment 4 of the present invention.

In Embodiment 3, the gain of current feedback control is determined based on the steering speed detection value of the steering speed detection means 23. The motor rotation speed detection means 3 may be used in place of the steering speed detection means 23 to change the gain of current feedback control according to a motor rotation speed detection value $\omega mtr$. FIG. 9 is a flow chart of current feedback control in Embodiment 4. The flow chart of FIG. 9 differs from the flow chart of FIG. 7 in that the input signal of step S12 is a motor rotation speed detection value $\omega mtr$ and the motor rotation speed detection value $\omega mtr$ is used as the index for switching the gain of current feedback control in step S4. Other operations are the same as those of Embodiment 3. The motor rotation speed detection means 3 is always provided when the motor 5 is a brushless motor. Therefore, an electric power steering system having a brushless motor as the motor 5 according to embodiment 4 does not require the steering speed detection means 23 which must be newly installed and can be constructed more easily at a lower cost than the electric power steering system of Embodiment 3.

Embodiment 5

Since the back electromotive force of the motor is in proportion to the rotation speed of the motor if the field is constant, the gain of current feedback control may be changed by estimating the back electromotive force of the motor 5. When the back electromotive force of the motor 5 is estimated, the estimated back electromotive force can be used in place of the motor rotation speed detection value obtained by the motor rotation speed detection means 3 and applied to the current instruction value determining means 4. Therefore, the motor rotation speed detection means such as a rotation speed sensor is not required.

Figure 10:
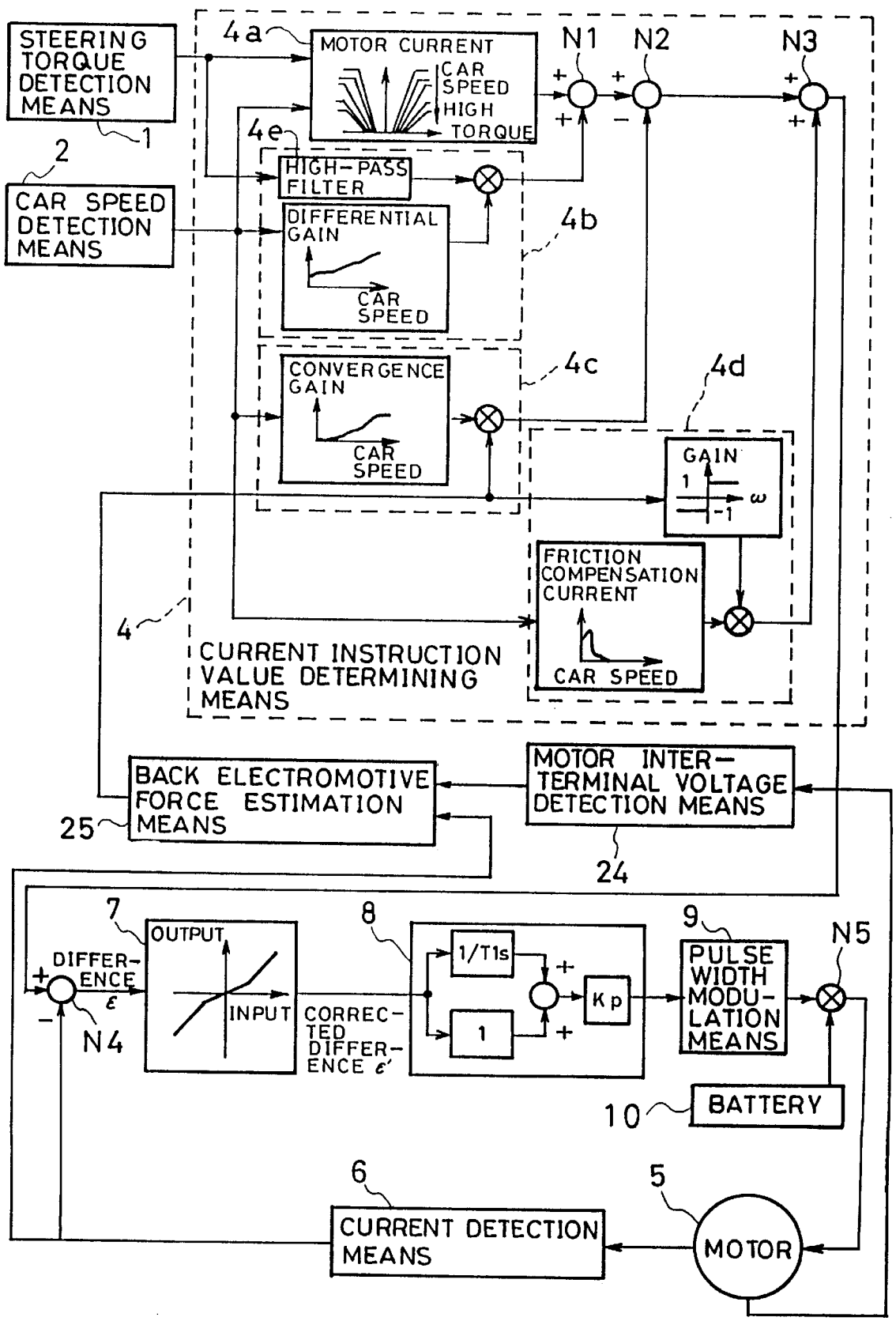
FIG. 10 is a block diagram showing a control unit and an input/output unit connected to the control unit of an electric power steering system according to Embodiment 5 of the present invention.
Figure 11:
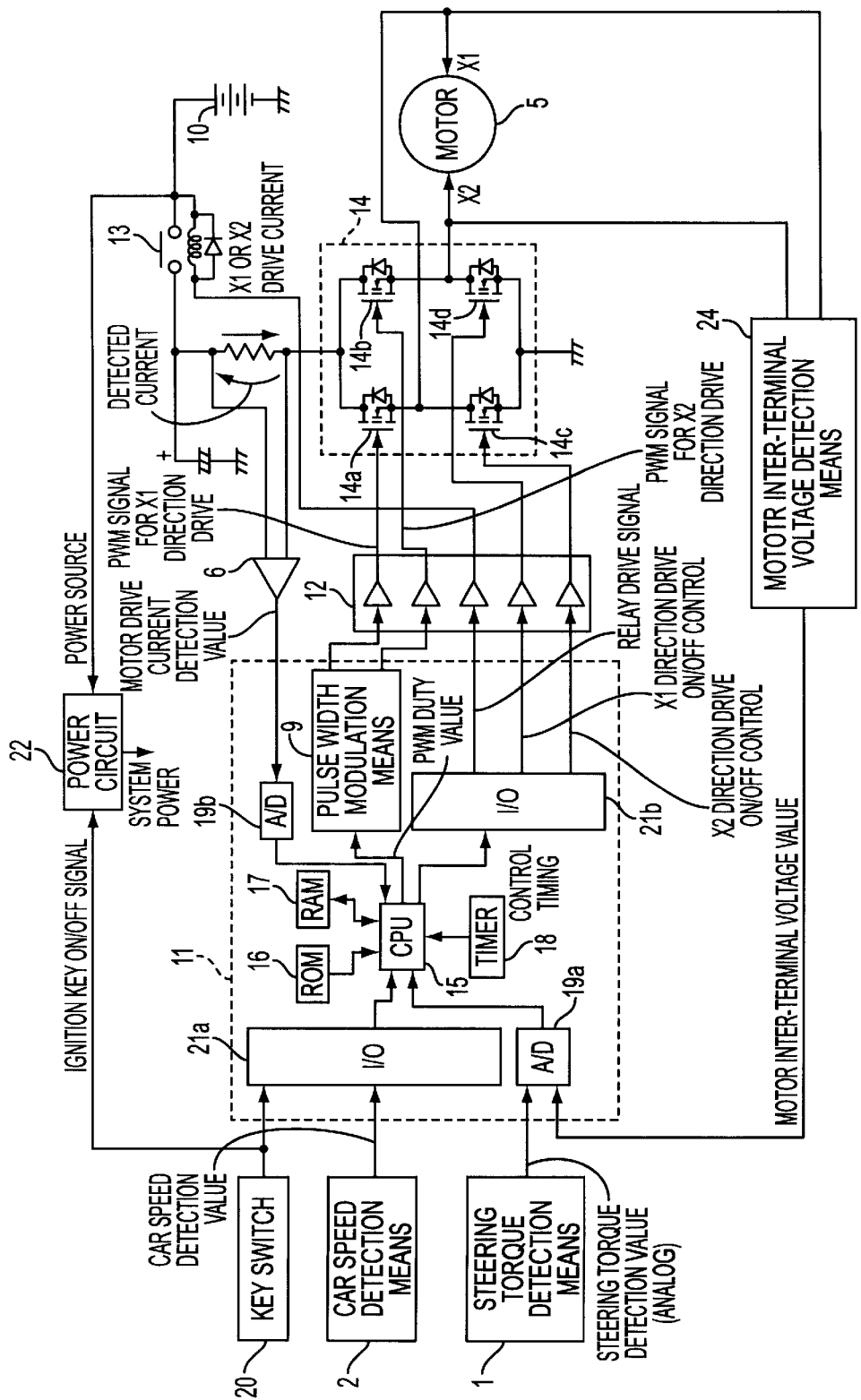
FIG. 11 is a block diagram showing the control unit and its peripheral circuits of the electric power steering system according to Embodiment 5 of the present invention.

FIG. 10 is a block diagram showing a control unit and an I/O unit connected to the control unit according to Embodiment 5, and FIG. 11 is a block diagram showing the control unit and its peripheral circuits. In these figures, motor inter-terminal voltage detection means 24 and back electromotive force estimation means 25 are provided in place of the motor rotation speed detection means 3. The back electromotive force estimation means 25 receives a motor inter-terminal voltage detection value from the motor inter-terminal voltage detection means 24 converted into an electric signal and a motor drive current detection value from the motor current detection means 6 converted into an electric signal and estimates the back electromotive force of the motor 5 from the motor inter-terminal voltage detection value and the motor drive current detection value. The back electromotive force estimation means 25 is constructed by the CPU 15, ROM 16 and RAM 17 of the microcomputer 11.

Figure 12:
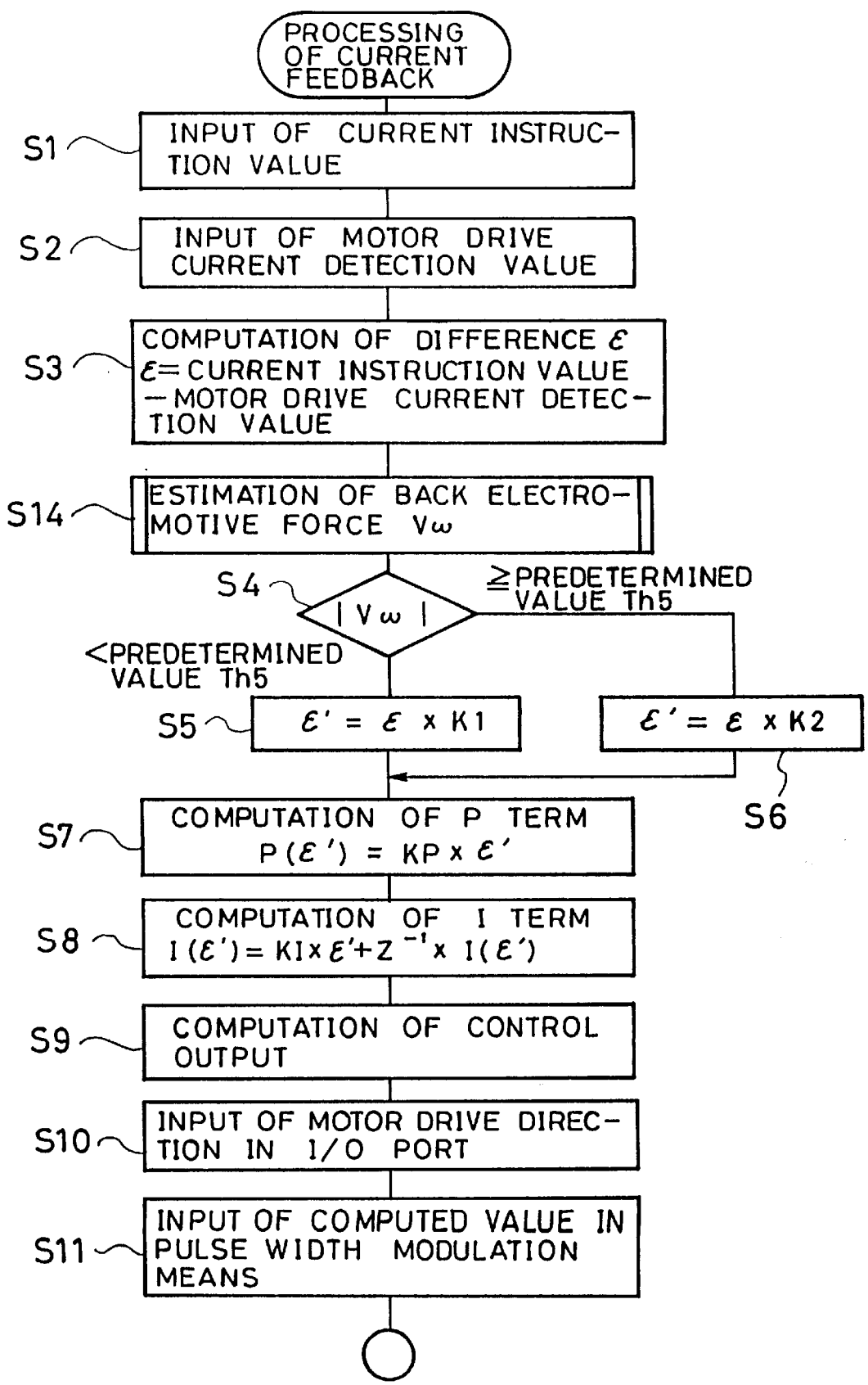
FIG. 12 is a flow chart of current feedback control of the electric power steering system according to Embodiment 5 of the present invention.

FIG. 12 is a flow chart of current feedback control in Embodiment 5. The flow chart of FIG. 12 differs from the flow chart of FIG. 3 in that step S14 is newly added and the index for switching the gain of current feedback control in step S4 is changed. The changes and their functions will be described hereinunder. The microcomputer 11 carries out arithmetic processing to estimate the back electromotive force $V\omega$ of the motor 5 based on a motor inter-terminal voltage detection value and a motor drive current detection value.

Figure 13:
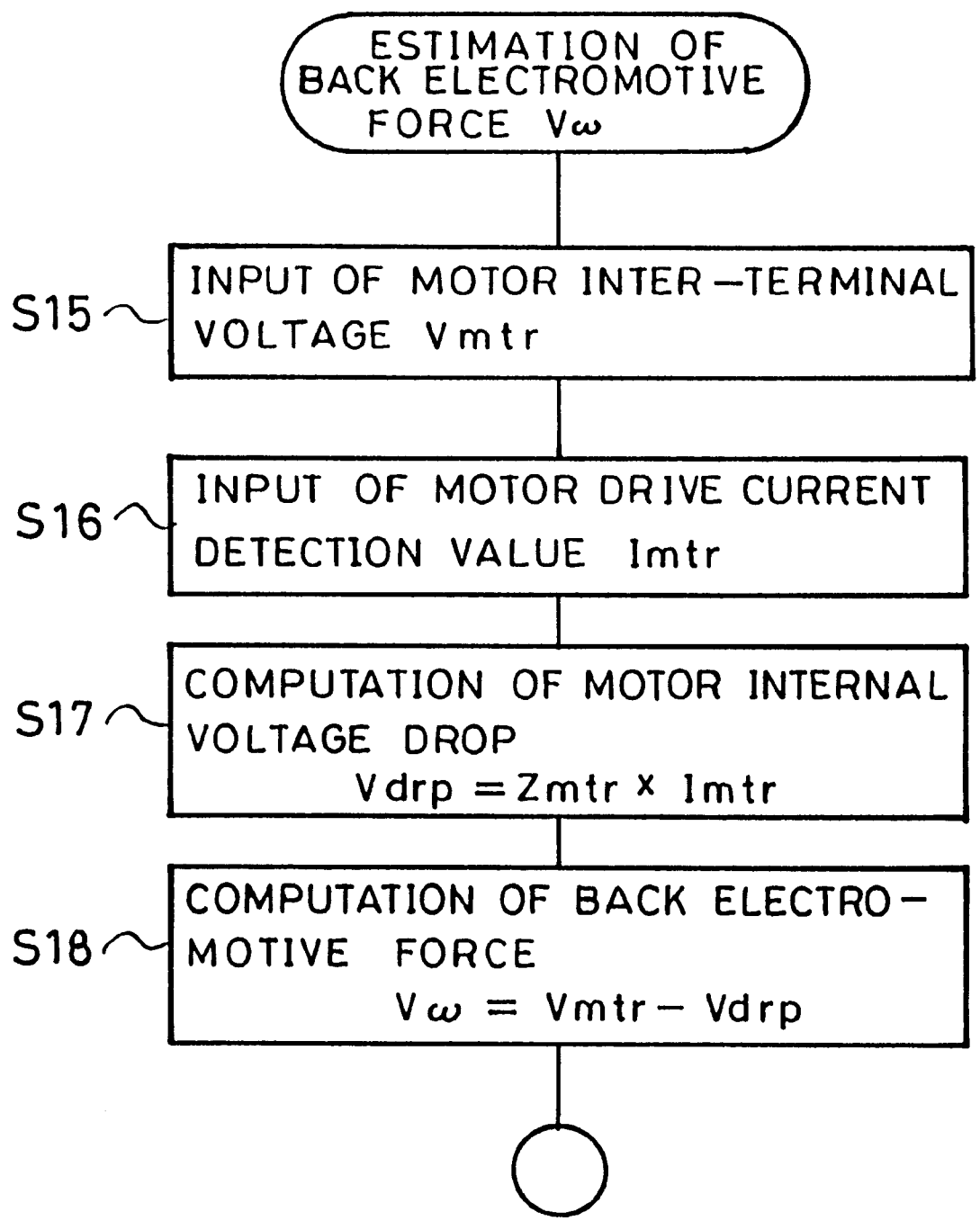
FIG. 13 is a flow chart for estimating the back electromotive force of the electric power steering system according to Embodiment 5 of the present invention.

FIG. 13 is a flow chart of a subroutine for estimating the back electromotive force $V\omega$ in the above step S14. The motor inter-terminal voltage detection value Vmtr is input in step S15 and the motor drive current detection value Imtr is input in step S16. In step S17, a motor internal voltage drop is computed from an impedance model between the terminals of the motor which is determined by the inductance, resistance and the like of the armature of the motor 5 and a motor drive current detection value Imtr from the current detection means 6 based on the expression $Vdrp = Zmtr \times Imtr$. In step S18, the back electromotive force $V\omega$ is obtained as a difference between the motor inter-terminal voltage detection value Vmtr and the motor internal voltage drop value Vdrp.

Therefore, in Embodiment 5, the estimation of the back electromotive force $V\omega$ is carried out in step S14 at each control cycle of motor current feedback control of FIG. 12. In step S4, the absolute value $|V\omega|$ of the back electromotive force $V\omega$ is compared with a predetermined value Th5. When the absolute value $|V\omega|$ is smaller than the predetermined value Th5, the routine proceeds to step S5 and when the absolute value $|V\omega|$ is equal to or larger than the predetermined value Th5, the routine proceeds to step S6. Thereby, the first correction gain K1 or the second correction gain K2 is suitably selected as the gain of current feedback control according to steering speed, thereby making it possible to achieve both follow-up properties when the steering wheel is turned quickly and stability when the steering wheel is held.

Embodiment 6

Figure 14:
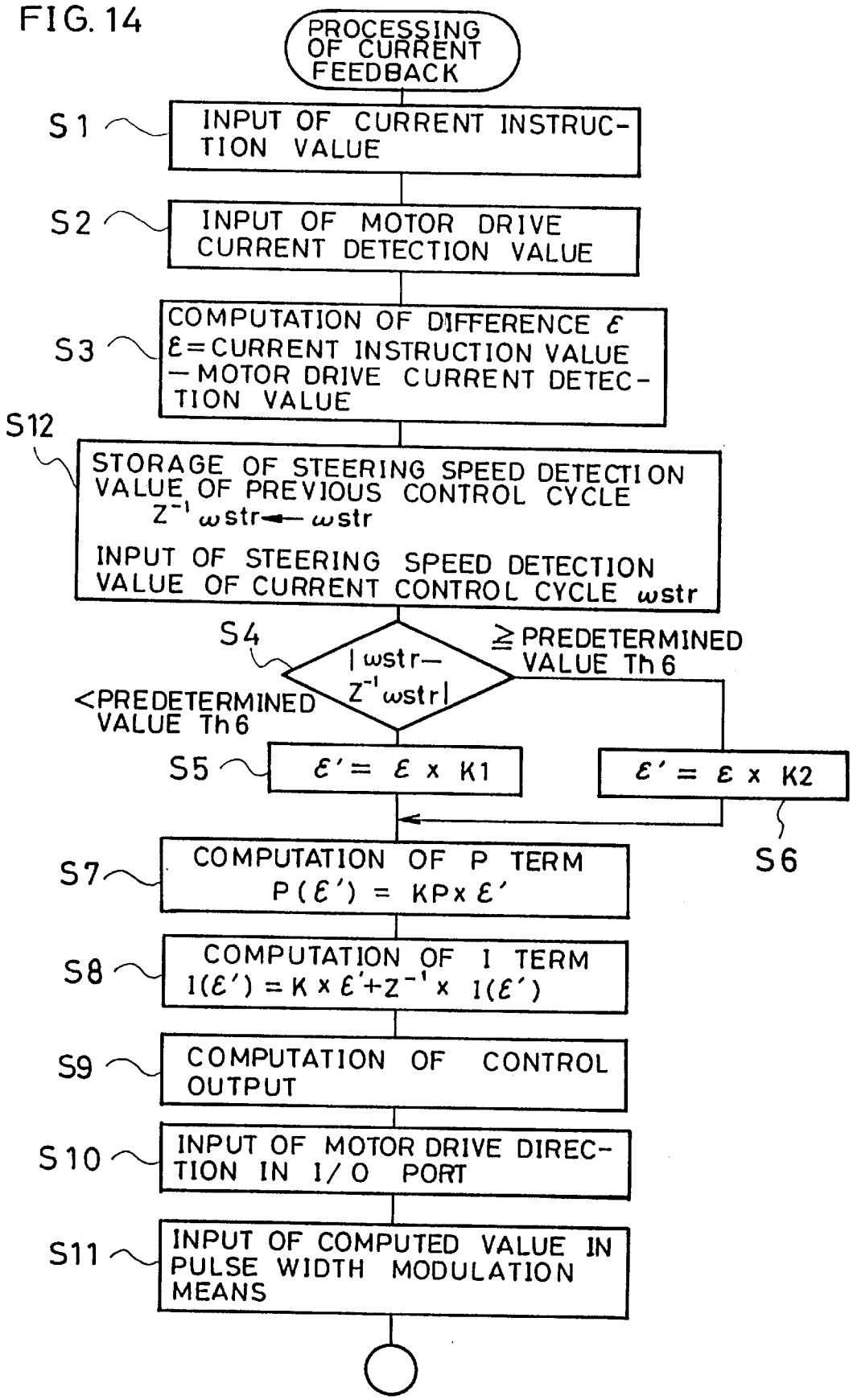
FIG. 14 is a flow chart of current feedback control of an electric power steering system according to Embodiment 6 of the present invention.

To ensure the follow-up properties of control when a change in steering speed is large, the detection value of the steering speed detection means 23, the detection value of the motor rotation speed detection means 3 or the output value of the back electromotive force estimation means 25 may be differentiated and the absolute value of the result may be used as the index for determining the gain of current feedback control. FIG. 14 is a flow chart of current feedback control in Embodiment 6. The flow chart of FIG. 14 differs from the flow chart of FIG. 7 in only the processings of steps S12 and S4. These processings and their functions will be described herein under. In step S12, the steering speed detection value ωstr which was input at the previous control cycle is stored as a one sample delayed steering speed detection value Z−1ωstr and then the steering speed detection value ωstr of the current control cycle is input. In step S4, the absolute value |Z−1ωstr−ωStr| of the difference between the previous steering speed detection value Z−1ωstr and the current steering speed detection value ωstr is compared with a predetermined value Th6. When the absolute value |Z−1ωstr−ωstr| is smaller than the predetermined value Th6, the routine proceeds to step S5 and when the absolute value |Z−1ωstr−ωstr| is equal to or larger than the predetermined value Th6, the routine proceeds to step S6. Since the first correction gain K1 is selected when a change in the steering speed is small and the second correction gain K2 is selected when the change in the steering speed is large, both follow-up properties and stability can be achieved according to a steering state by changing the gain of current feedback control.

In Embodiment 6, as shown in step S12 of FIG. 14, the steering speed detection value is differentiated and the gain of current feedback control is set based on the result of the differentiation. The detection value of the motor rotation speed detection means 3 in Embodiment 4 or the output value of the back electromotive force estimation means 25 in Embodiment 5 may be differentiated and used in place of the differentiated value of the output str in step S4. The differentiating means differentiates the sampling value at each control cycle by a rear difference with software. Alternatively, known differential processing with software using bilinear conversion, differential processing with hardware such as an operational amplifier or the like may be used.

Embodiment 7

Figure 15:
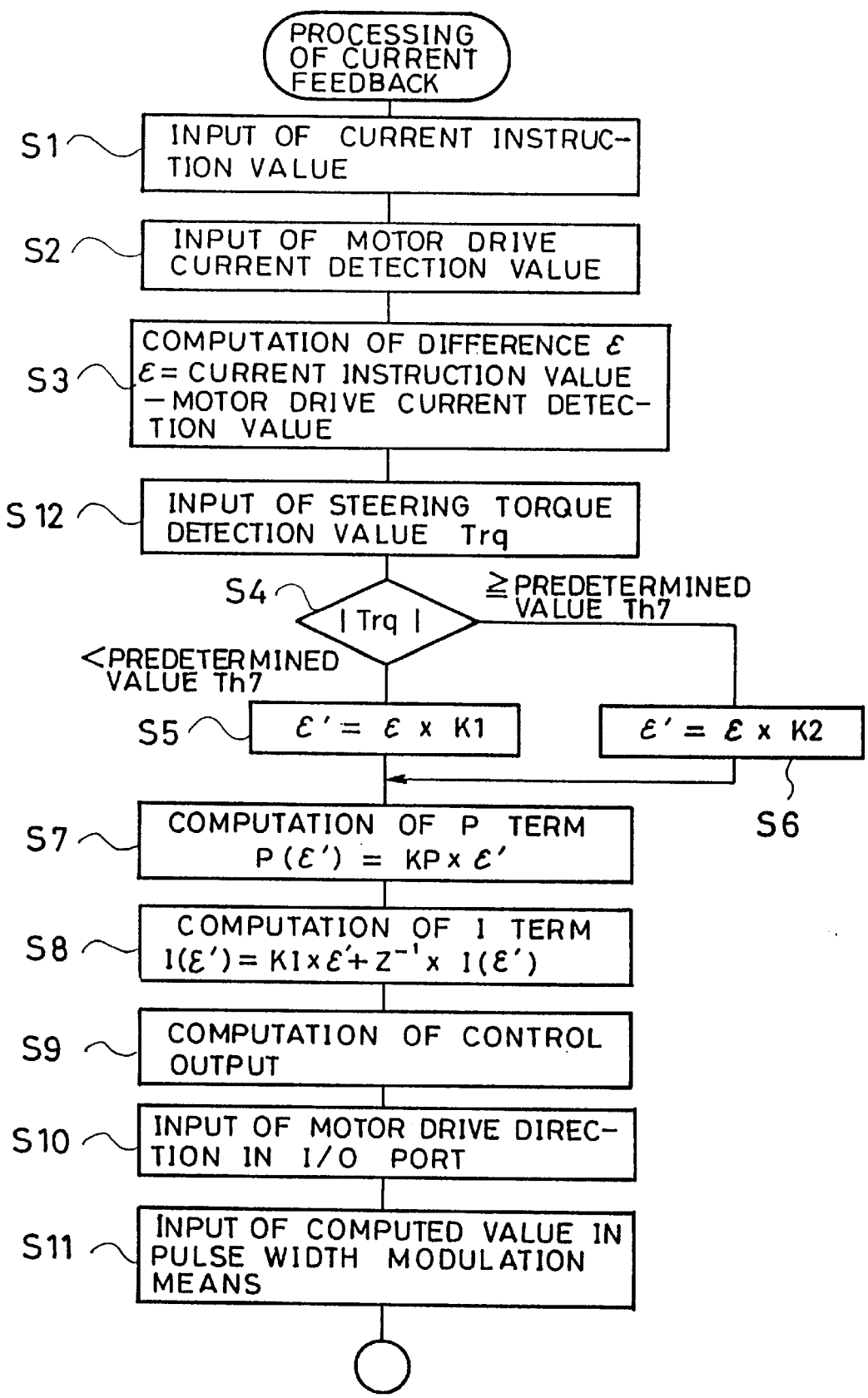
FIG. 15 is a flow chart of current feedback control of an electric power steering system according to Embodiment 7 of the present invention.

Stability of current feedback control is especially required when the great assist force of the motor 5 is required as in the case of turning the steering wheel while the vehicle is stopped, or holding or turning the steering wheel slowly while the vehicle is driven at a low speed. Therefore, the gain of current feedback control may be changed according to a steering torque detection value from the steering torque detection means 1. FIG. 15 is a flow chart of current feedback control in Embodiment 7. The flow chart of FIG. 15 differs from the flow chart of FIG. 7 in only the processings of steps S12 and S4. The processings and their functions will be described herein under. In step S12, a steering torque detection value Trq is input from the steering torque detection means 1. In step S4, the absolute value |Trq| of the steering torque detection value Trq is compared with a predetermined value Th7. When the absolute value |Trqd| is smaller than the predetermined value Th7, the routine proceeds to step S5 and when the absolute value |Trqd| is equal to or larger than the predetermined value Th7, the routine proceeds to step S6. Since the first correction gain K1 is selected when steering force is small as in the case of operating the steering wheel during running or starting turning the steering wheel, follow-up properties can be ensured by changing the gain of current feedback control. Since the second correction gain K2 larger than the first correction gain K1 is selected when steering force is large as in the case of turning the steering wheel while the vehicle is stopped, quick response can be ensured. Therefore, both follow-up properties and stability can be achieved according to a steering state.

Embodiment 8

In Embodiment 7, the stability of current feedback control is ensured by changing the gain of current feedback control according to the steering torque detection value when the great assist force of the motor is required. The same effect can be obtained by using the current instruction value or the motor drive current detection value in place of the steering torque detection value to judge if the steering wheel is turned or held. To implement this Embodiment 8, in FIG. 15 of Embodiment 7, the current instruction value or the motor drive current detection value is used as the input index of step S12 in place of the steering torque detection value Trq and the predetermined value Th7 for determining the gain of current feedback control in step S4 is set to an appropriate value for the current instruction value or the motor drive current detection value.

Embodiment 9

Since it is considered that great assist force is required only when the steering wheel is turned while the vehicle is stopped or driven at a low speed, the car speed may be used as the index for switching the gain of current feedback control so that the gain of current feedback control is reduced when the car speed is low and increased when the car speed is high. To implement Embodiment 9, in FIG. 15 of Embodiment 7, the car speed detection value is used as the input index in step S12 in place of the steering torque detection value Trq and the predetermined value Th7 for determining the gain of current feedback control is set to an appropriate value for the car speed in step S4.

Embodiment 10

In Embodiments 1 to 9, by comparing the index for switching the gain of current feedback control with a predetermined value at each control cycle of current feedback control, a correction gain is determined and selected. To prevent hunting at the time of switching, a hysteresis element may be added to the predetermined value as a condition for selecting the correction gain. Therefore, hysteresis is added in Embodiment 10 so that when the index for switching the gain of current feedback control is changed from a small value to a large value, that is, larger than a predetermined value "1", the first correction gain K1 is switched to the second correction gain K2 and when the index is changed from a large value to a small value, that is, smaller than a predetermined value "2", the second correction gain K2 is switched to the first correction gain K1.

Figure 16:
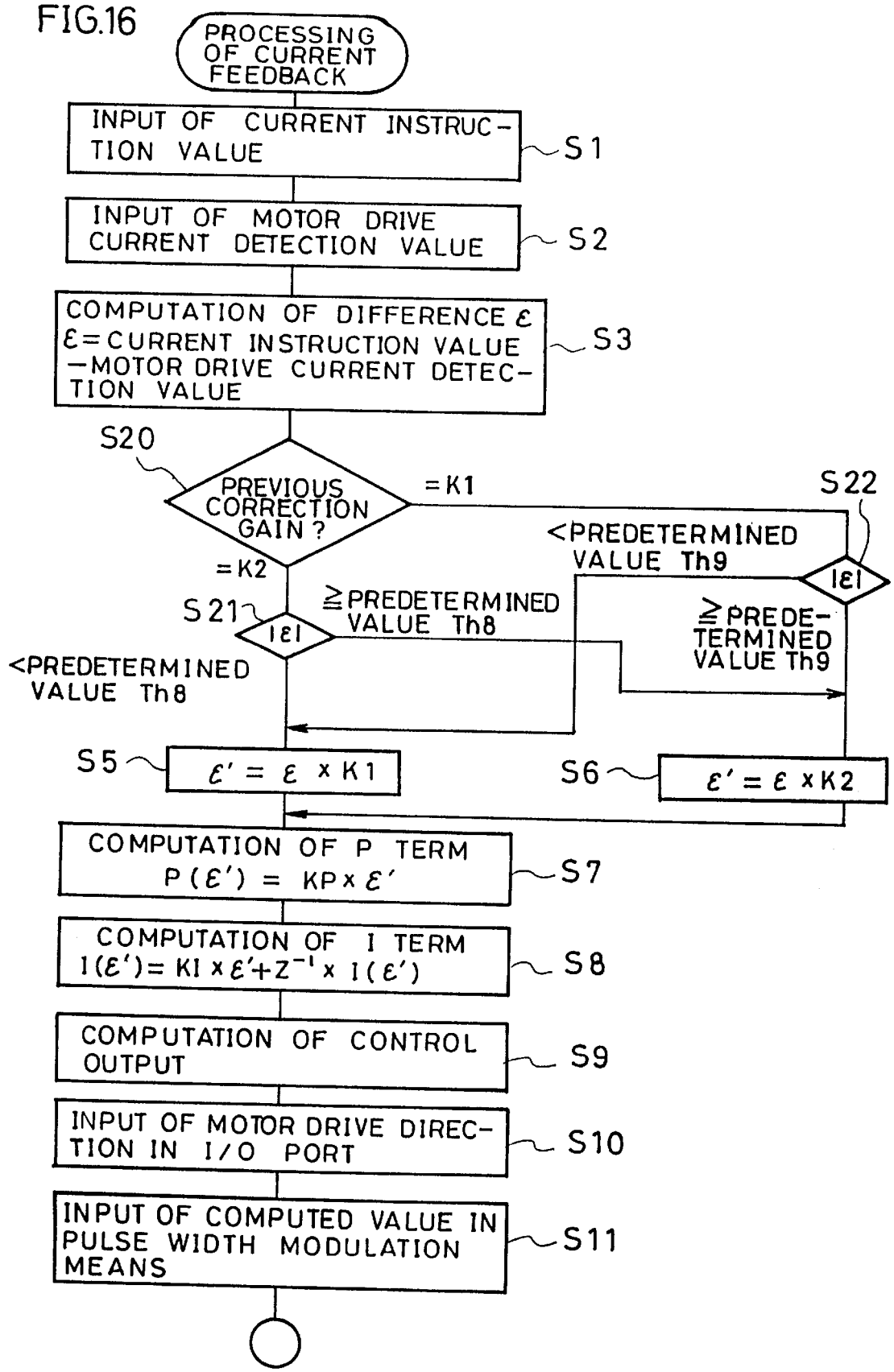
FIG. 16 is a flow chart of current feedback control of an electric power steering system according to Embodiment 10 of the present invention.
Figure 17:
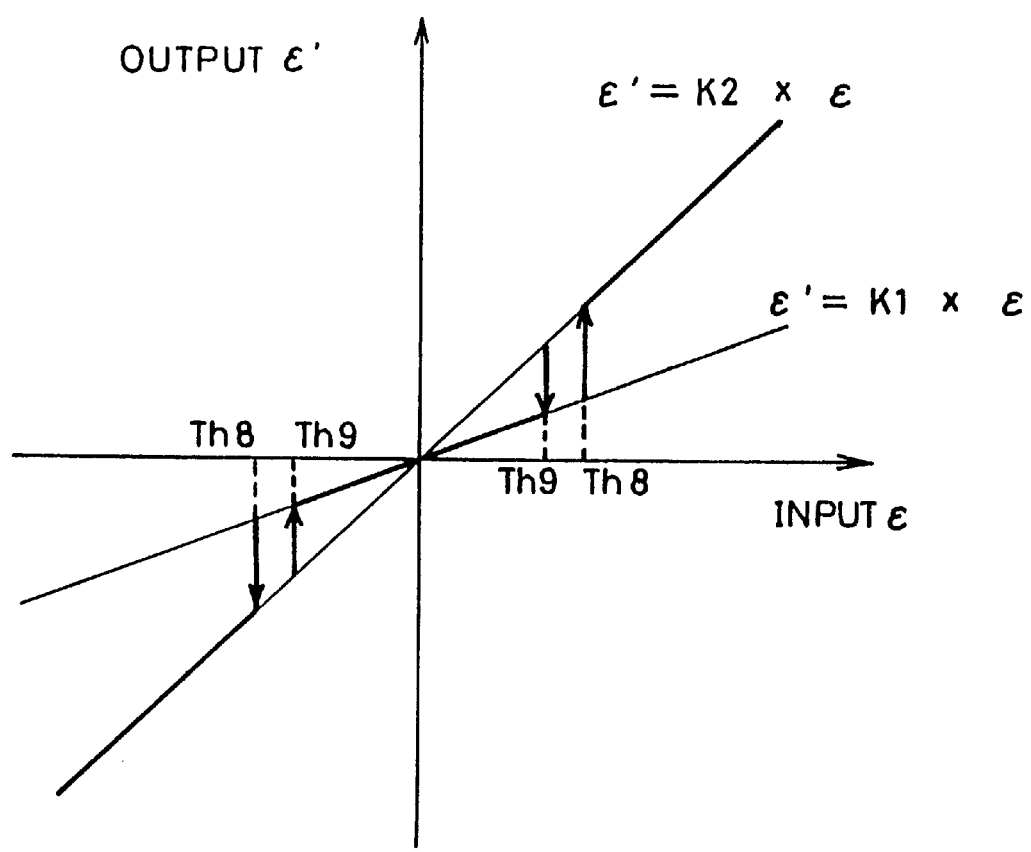
FIG. 17 is a diagram for explaining the gain hysteresis correction characteristics of current feedback control of the electric power steering system according to Embodiment 10 of the present invention.

FIG. 16 is a flow chart of current feedback control in Embodiment 10 and FIG. 17 shows the correction characteristics of the gain of current feedback control in Embodiment 10. The flow chart of FIG. 16 differs from the flow chart of FIG. 3 in that step 4 of setting the gain of current feedback control based on the difference is replaced by steps S20 to S22. In step S20, when the previous correction gain is large (previous correction gain=K2), the routine proceeds to step S21 and when the previous correction gain is small (previous correction gain=K1), the routine proceeds to step S22. In steps S21 and S22, the size of the difference is compared with a plurality of different predetermined values Th8 and Th9, and thereby the routine proceeds to step S5 or S6, whereby hysteresis characteristics as shown in FIG. 17 can be obtained as the corrected difference ξ'. Since hysteresis is added to the setting of the gain of current feedback control, hunting at the time of switching the gain can be prevented and both stability and follow-up properties can be obtained with more certainty. Since the object of Embodiment 10 is to prevent the correction gain from hunting around the predetermined values for determining the switching of the gain of current feedback control, the same effect can be obtained when the index for switching the gain of current feedback control in Embodiment 10 is an operation torque detection value, current instruction value, motor drive current detection value or the like as in other embodiments.

Embodiment 11

In Embodiment 1, to switch the gain of current feedback control, the gain of current feedback control is changed to the first correction gain K1 or the second correction gain K2 by comparing the difference ξ between the current instruction value and the motor drive current detection value with the predetermined value Th1. Instead of this, the difference ξ between the current instruction value from the current instruction value determining means 4 and the motor drive current detection value from the current detection means 6 is used as the index for setting the gain of current feedback control, and when the first correction gain is represented by K1, the second correction gain is represented by K2, the predetermined value to be compared with the index for setting the gain of current feedback control is represented by C, and the absolute value |ξ| of the difference ξ is smaller than the predetermined value C, a first correction operation expression ξ'=ξ×K1 is used and when the absolute value |ξ| is equal to or larger than the predetermined value C, a second correction operation expression ξ'=ξ×K2− sign ξ×C×(K2−K1) is used. The word "sign" means the sign of ξ.

Figure 18:
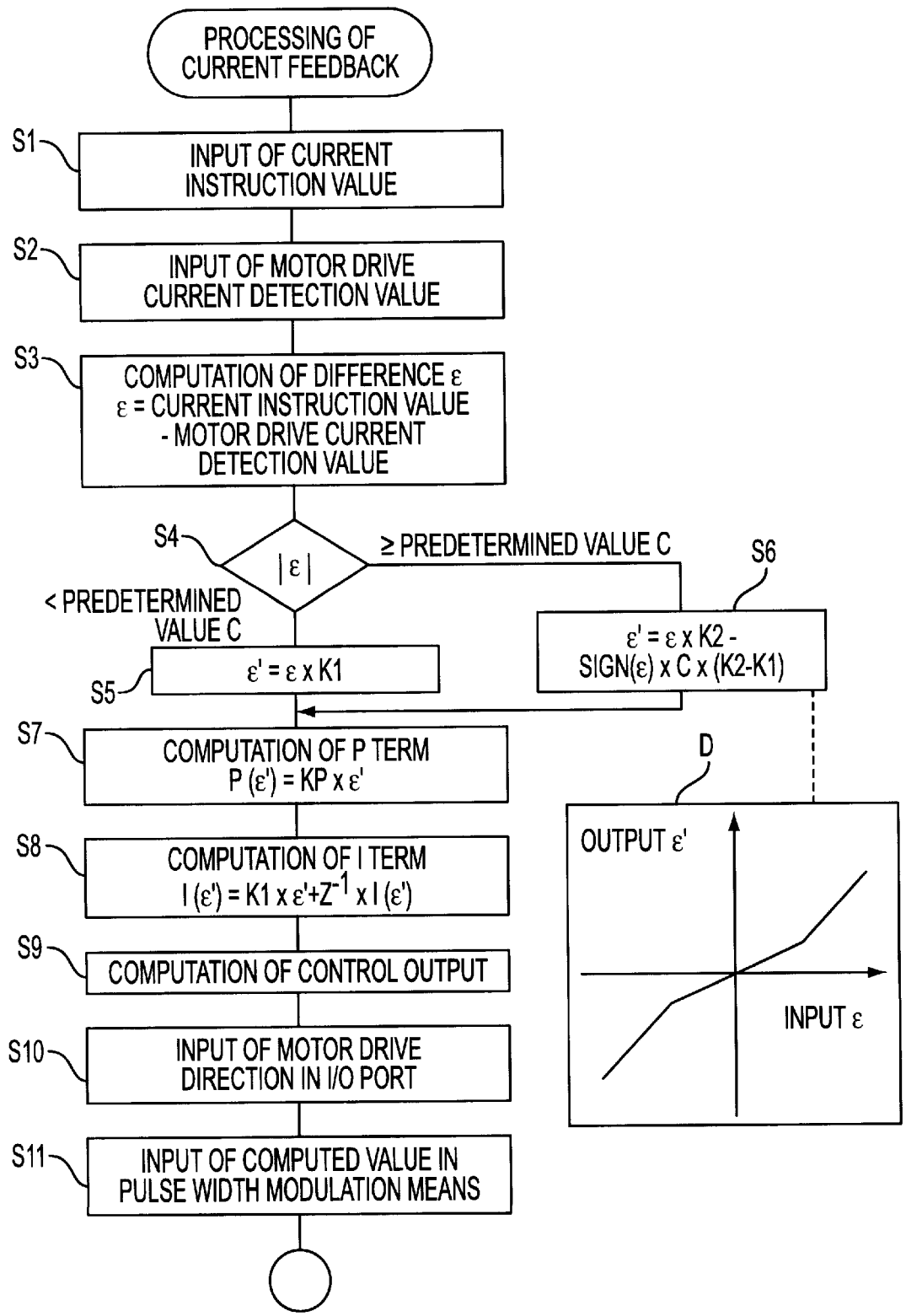
FIG. 18 is a flow chart of current feedback control of an electric power steering system according to Embodiment 11 of the present invention.

FIG. 18 is a flow chart of current feedback control in Embodiment 11. The flow chart of FIG. 18 differs from the flow chart of FIG. 3 in the processing of step S6. The change and its function will be described herein under. In step S4, the absolute value |ξ| of the difference ξ between the current instruction value and the motor drive current detection value is compared with the predetermined value C. When the absolute value |ξ| is smaller than the predetermined value C, the routine proceeds to step S5 and when the absolute value |ξ| is equal to or larger than the predetermined value C, the routine proceeds to step S6. According to this constitution, when a change in the steering force of the driver is small, the gain of current feedback control is corrected to the first correction gain K1 in step S5. When the change is large, the computation of the second correction operation expression is carried out in step S6 and the correction difference ξ' which changes continuously according to the absolute value |ξ| is thereby obtained as shown in the inside of the frame D', thereby making it possible to achieve the stability of torque control by stabilizing the response of current control when the electric power steering system is installed in a gear box, reduce control sound and achieve follow-up properties to the current instruction value.

Embodiment 12

Figure 19:
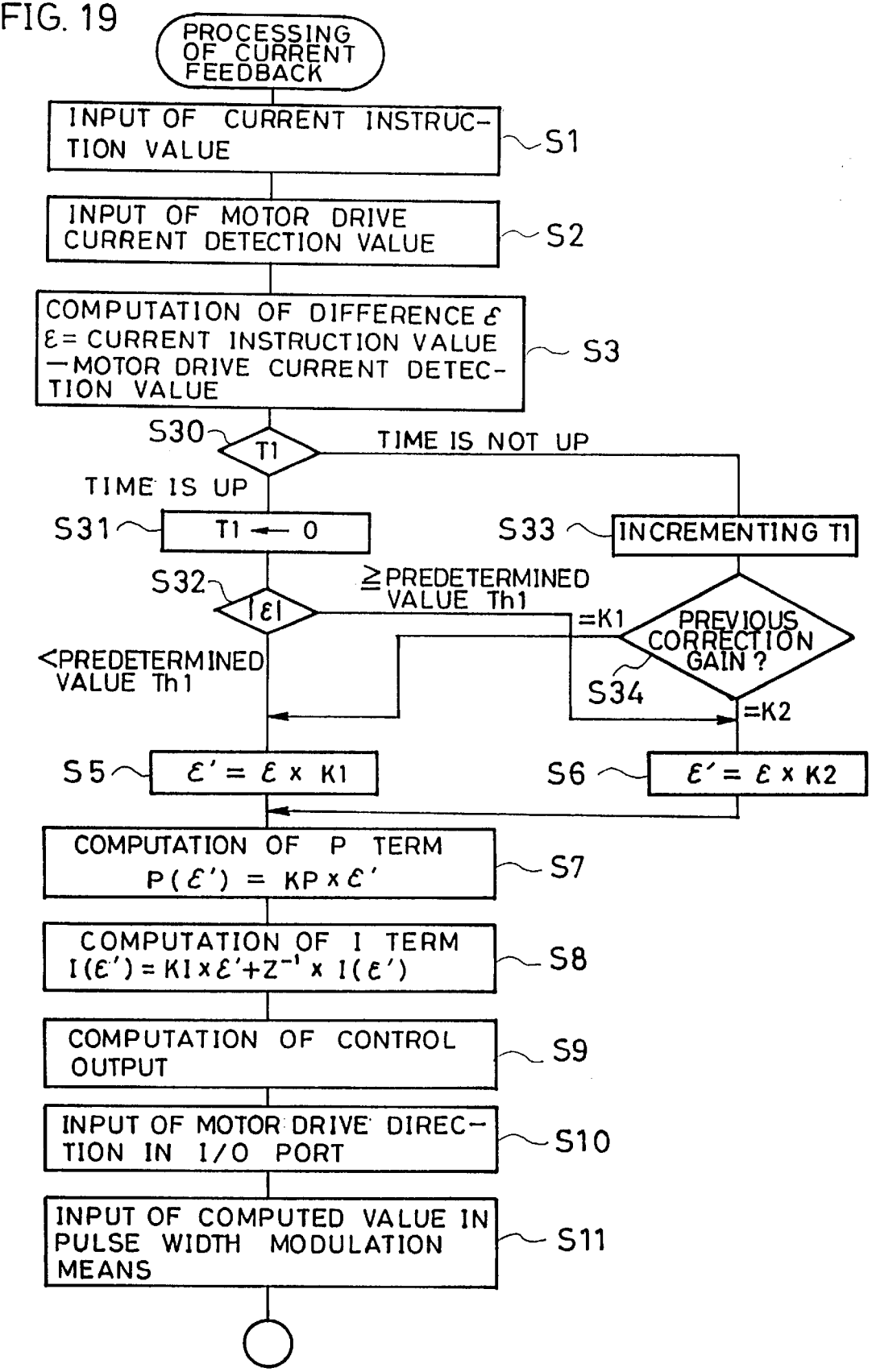
FIG. 19 is a flow chart of current feedback control of an electric power steering system according to Embodiment 12 of the present invention.
Figure 20:
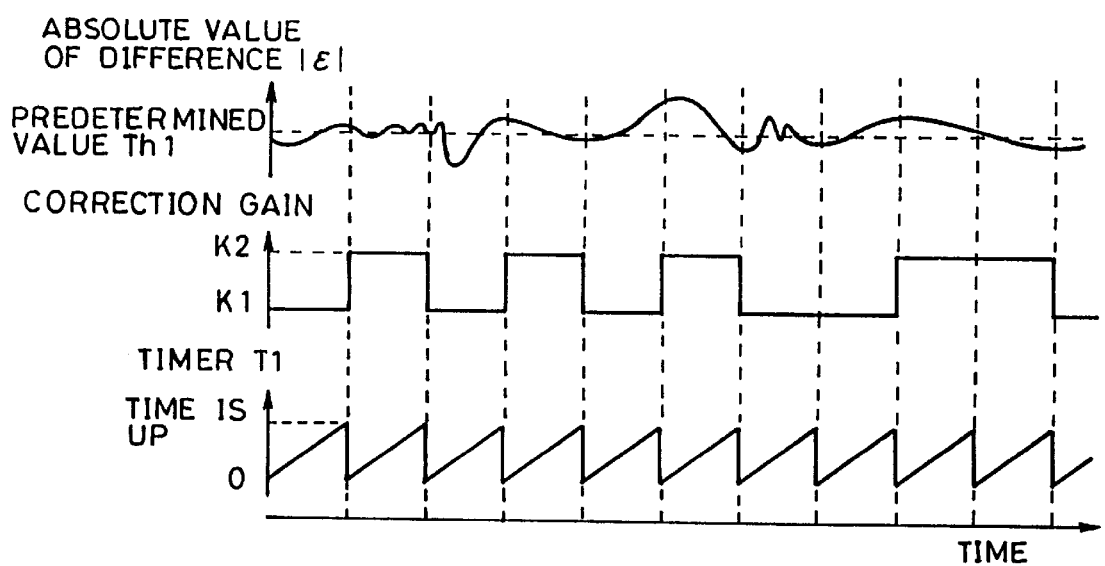
FIG. 20 is a time chart for judging and switching the correction gain of current feedback control of the electric power steering system according to Embodiment 12 of the present invention.

A timer may be provided to judge the index for setting the gain of current feedback control so as to change the correction operation expression according to the judgment result of the index and the correction operation expression is kept for a predetermined time so that a correction gain is judged at intervals of a time set by the timer so as to prevent hunting at the time of switching the gain. FIG. 19 is a flow chart of current feedback control in Embodiment 12 and FIG. 20 is a time chart of Embodiment 12. The flow chart of FIG. 19 differs from the flow chart of FIG. 3 in that only steps S4 to S6 are replaced by steps S30 to 34. These changes and their functions will be described herein under. In step S30, it is judged whether a time set by the timer T1 is up. When the time is up, the routine proceeds to step S31 and when the time is not up, the routine proceeds to step S33. The timer T1 is reset to "0" in step S31 and the index for setting the gain of current feedback control (absolute value |ξ| of the difference between the current instruction value and the motor drive current detection value in Embodiment 12) is compared with the predetermined value Th1 in step 32 and the routine proceeds to step S5 or S6 according to the result of comparison to carry out the correction of the gain of current feedback control. In step S33, the timer T1 is incremented and then the routine proceeds to step S5 or S6 to retain the correction gain of the previous control cycle. Therefore, the gain of current feedback control is maintained at the first correction gain K1 or the second correction gain K2 during the time set by the timer T1, thereby making it possible to prevent the gain of current feedback control from hunting.

Embodiment 13

The gain of current feedback control may be corrected based on a battery voltage. When the duty rate of a PWM signal based on the output of the PI controller 8 is represented by Dty, the battery voltage (power voltage) is represented by Vb and the main circuit 14 outputs a motor inter-terminal voltage Vmtr in response to the PWM signal from the pulse width modulation means 9, vmtr is obtained from the expression Vmtr =Dty×Vb. Dty is given by the PI controller based on the expression Dty=ξ'×(1+1/(T1. s))× KP. ξ' is a corrected difference and (1+1/(T1. s))×KP is computed by the PI controller 8. Therefore, since the effective inter-terminal voltage Vmtr to be applied between the terminals of the motor as control based on the difference ξ is obtained by removing the influence of changes in battery voltage Vb, the gain of current feedback control of the PI controller 8 may be corrected using the following expression which includes a correction term for battery voltage. Dty= ξ'×(1+1/(T1. s))×KP×Vb_ctr/vb wherein vb_ctr is a normalized battery voltage value.

Figure 21:
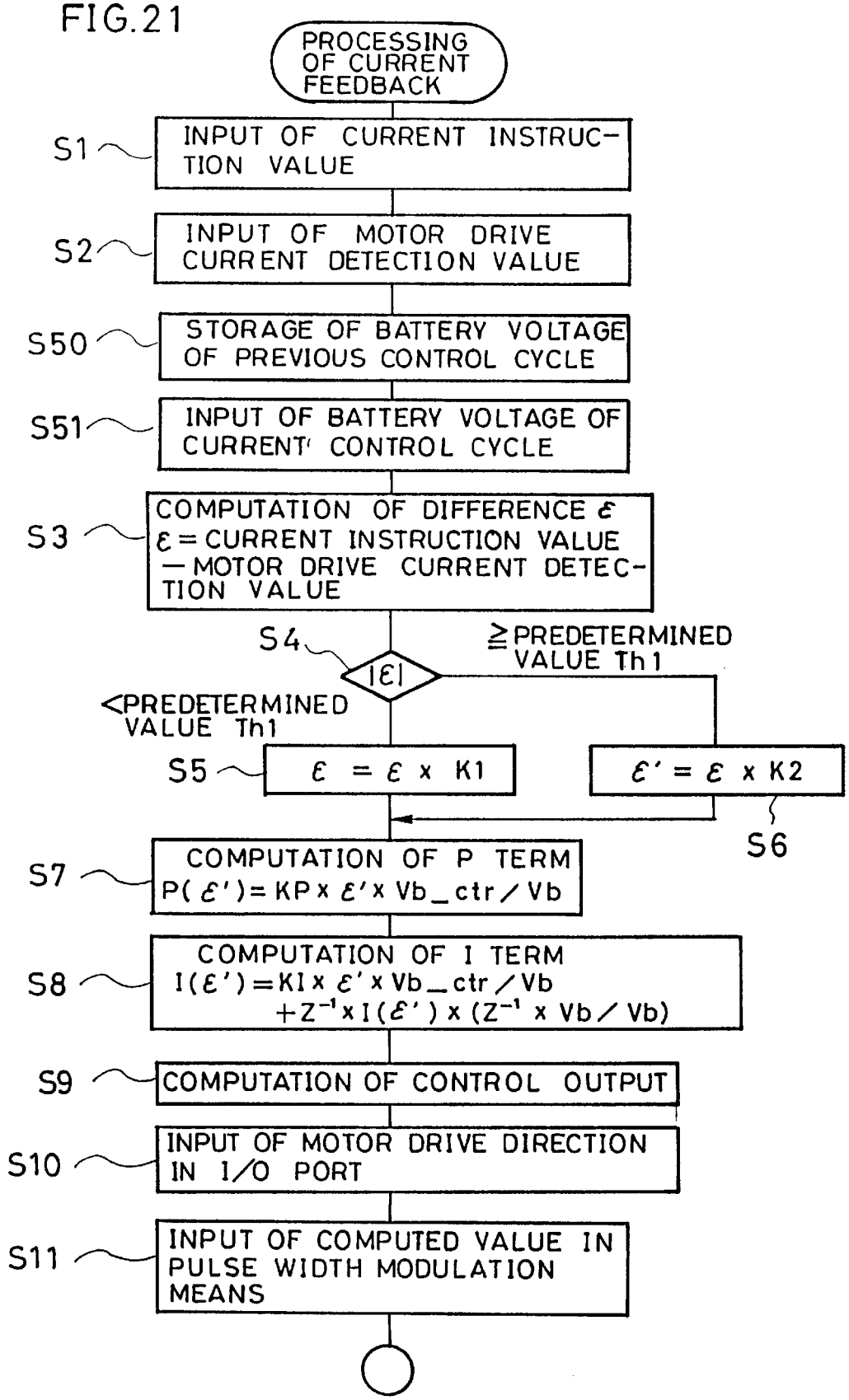
FIG. 21 is a flow chart of current feedback control of an electric power steering system according to Embodiment 13 of the present invention.

FIG. 21 is a flow chart of current feedback control in Embodiment 13. The flow chart of FIG. 21 differs from the flow chart of FIG. 3 in that the battery voltage Vb of the previous control cycle is retained in step S50 and the battery voltage Vb of the current control cycle is input in step S51 between steps S3 and S4. Further, a change in the battery voltage Vb is corrected in the computation of a P term in step S7 and the computation of an I term in step S8. That is, in step S7, the proportional gain KP is corrected with a battery voltage Vb and multiplied by a coefficient Vb_ctr/Vb. The current integral gain K1 is corrected with the coefficient Vb_ctr/Vb in the I term like the P term and the previous integral value is corrected with a ratio Z−1×Vb/Vb of the battery voltage of the previous control cycle Z−1×Vb to the battery voltage Vb of the current control cycle. Thus, by correcting the gain of current feedback control with a battery voltage, the first correction gain K1 or the second correction gain K2 can be selected without being influenced by the battery voltage, thereby making it possible to set the control bandwidth and the cross frequency f at the most effective points from the view points of transient response and stationary stability of current feedback control. Thus, the response and stability of current control can be optimized and hardly influenced by power voltage.

Embodiment 14

Figure 22:
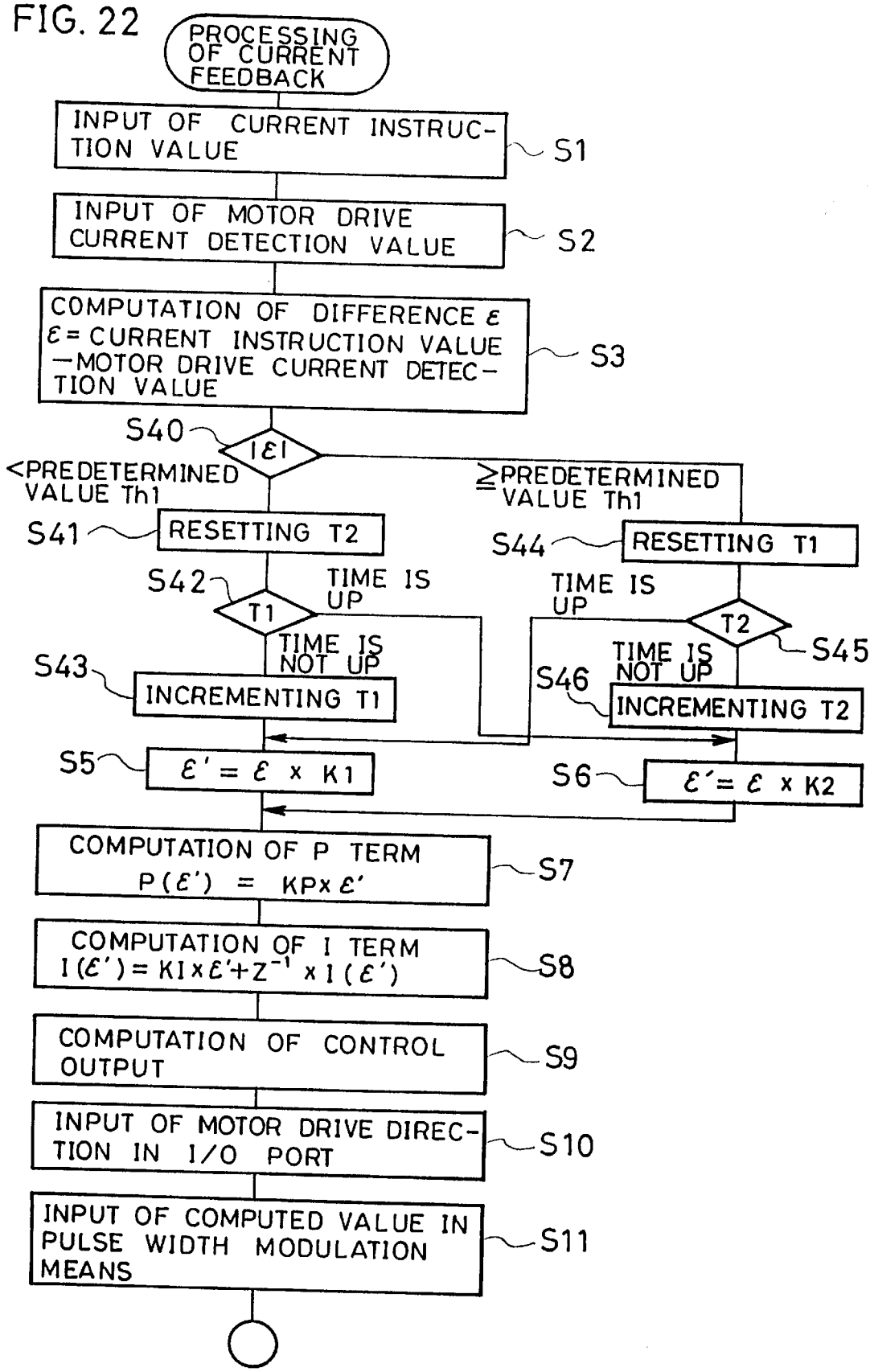
FIG. 22 is a flow chart of current feedback control of an electric power steering system according to Embodiment 14 of the present invention.
Figure 23:
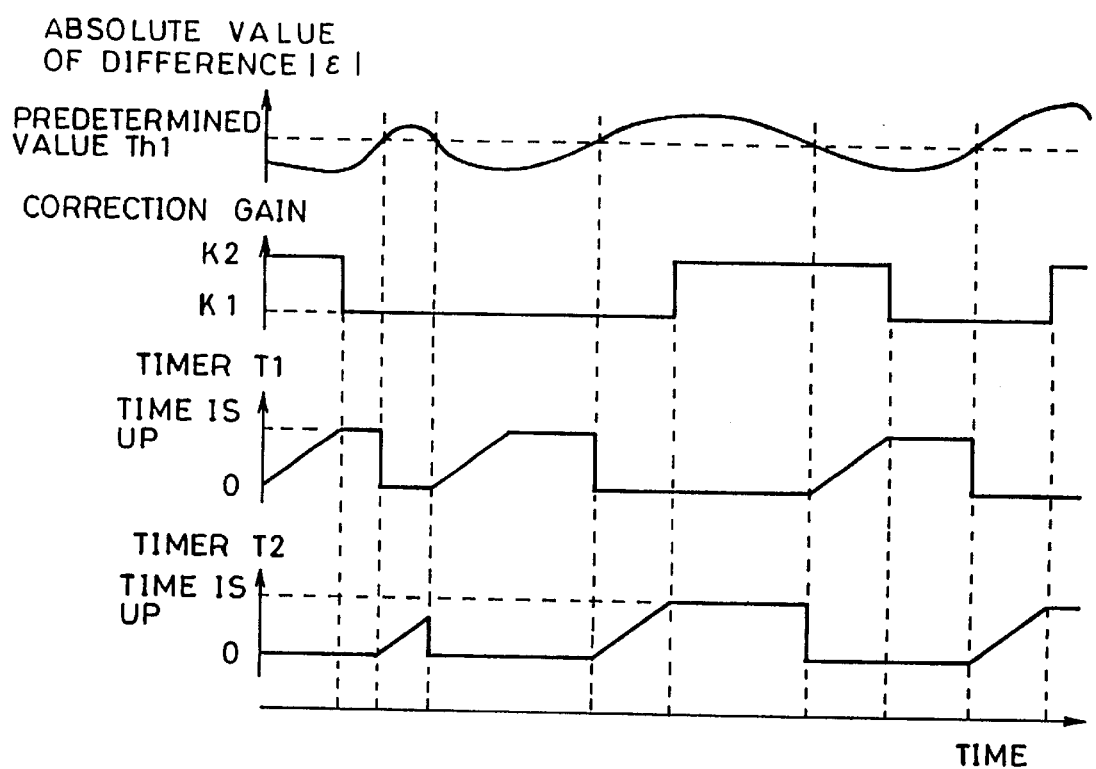
FIG. 23 is a time chart for judging and switching the correction gain of current feedback control of the electric power steering system according to Embodiment 14 of the present invention.

In Embodiment 12, timer processing is used to prevent hunting at the time of switching the gain. A timer may be provided to judge the index for selecting an operation expression for current feedback control and the difference between the current instruction value and the motor drive current detection value is corrected using a first operation expression when the result of judgment is larger than a predetermined value "1" for a predetermined time and a second operation expression when the result of judgment is smaller than a predetermined value "2" for a predetermined time to carry out current feedback control. FIG. 22 is a flow chart of current feedback control in Embodiment 14 and FIG. 23 is a time chart of Embodiment 14. The flow chart of FIG. 22 differs from the flow chart of FIG. 19 in that there are no steps S50 and S51 and step S4 is replaced by steps S40 to 46 to change the processing of the timer. This change and its function will be described herein under. In step S40, it is judged whether the absolute value $|\xi|$ of the difference is equal to or larger than the predetermined value Th1. When the absolute value $|\xi|$ is smaller than the predetermined value Th1, the routine proceeds to step S41 and when the absolute value $|\xi|$ is equal to or larger than the predetermined value Th1, the routine proceeds to step S44. A timer T2 for judging a continuation time during which the absolute value $|\xi|$ is equal to or larger than the predetermined value Th1 is initialized in step S41, and it is checked if a time set by a timer T1 for judging a continuation time during which the absolute value $|\xi|$ is smaller than the predetermined value Th1 is up in step S42. When the time is up, the first correction operation expression in step S5 is selected and when the time is not up, the timer T1 is incremented in step S43 and the second correction operation expression in step S6 is retained. The timer T1 is initialized in step S44, and it is checked if a time set by the timer T2 for judging the continuation time during which the absolute value $|\xi|$ is smaller than the predetermined value Th1 is up in step S45. When the time is up, the second correction operation expression in step S6 is selected and when the time is not up, the timer T2 is incremented in step S46, and the first correction operation expression in step S5 is retained. Thus, as the correction operation expression is switched to the first correction operation expression or the second correction operation expression only when the absolute value $|\xi|$ is smaller than the predetermined value Th1 for the duration of a time set by the timer T1 or more or when the absolute value $|\xi|$ is equal to or larger than the predetermined value Th1 for the duration of a time set by the timer T2 or more, the processing of selecting a correction operation expression can be prevented from hunting.

Embodiment 15

Figure 24:
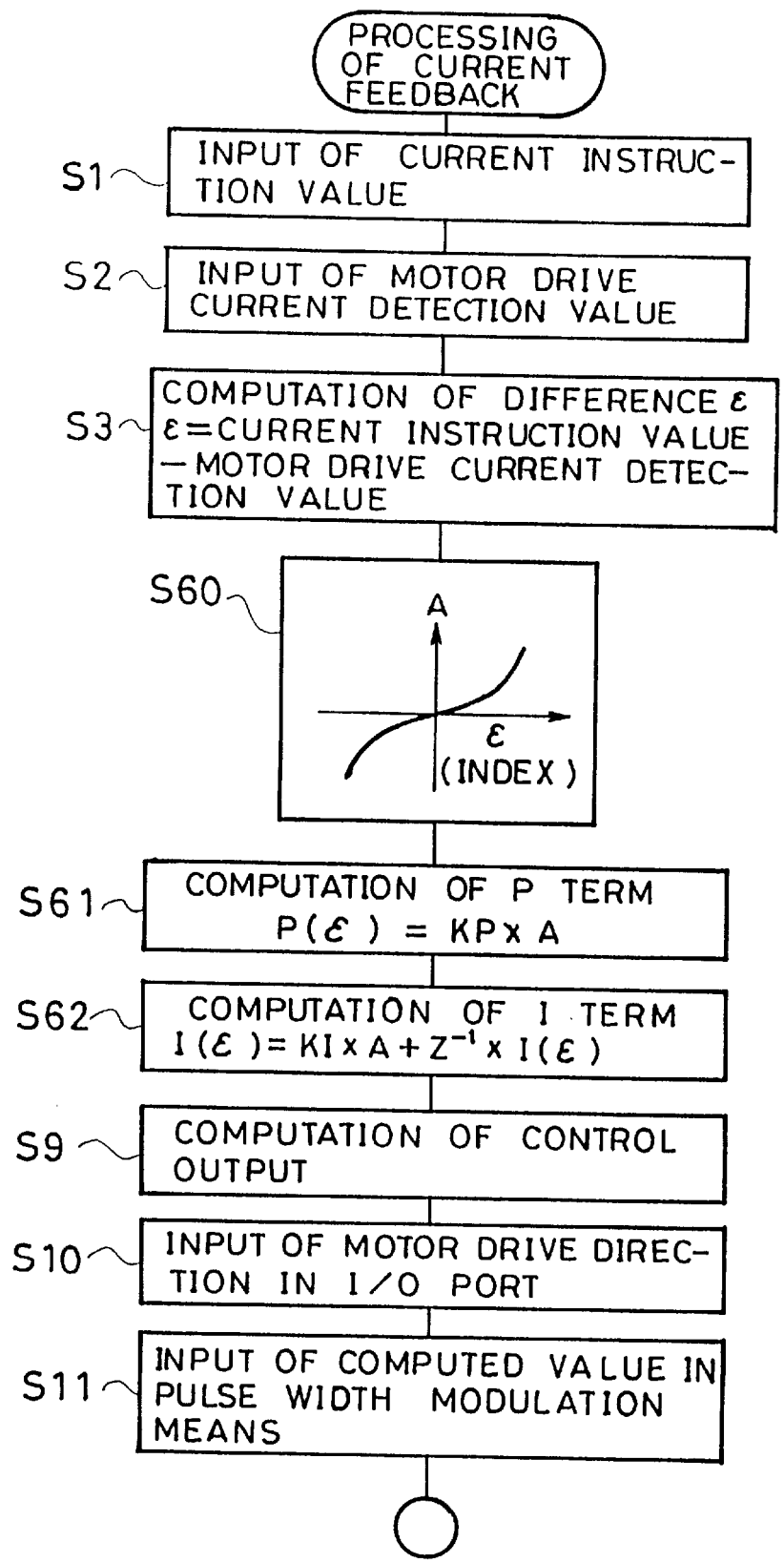
FIG. 24 is a flow chart of current feedback control of an electric power steering system according to Embodiment 15 of the present invention.

In the above embodiments, both response and stability are achieved by selecting the first operation expression or the second operation expression for current feedback control. The operation expression is not switched according to a predetermined value in this embodiment but the correction operation expression which is determined according to an index I for setting an operation expression is represented by A(I), a microcomputer comprises means for correcting the gain of current feedback control with A(I), the correction operation expression A(I) includes a correction operation expression which satisfies $dA(I)/dI \geq 0$, and the gain of current feedback control may be changed gradually by the index I for setting an operation expression. FIG. 24 is a flow chart of current feedback control in Embodiment 15. The flow chart of FIG. 24 differs from the flow chart of FIG. 3 in that steps S4 to S6 are replaced by the arithmetic processing of the correction operation expression A of step S60 and steps S7 and S8 for the computations of P and I terms are replaced by steps S61 and 62 using the computation result of the step S60, respectively. In step S60, a correction feedback amount A which is based on the value of the difference $\xi$ is output. In steps S61 and S62, the computations of P and I terms are carried out using the correction feedback amount A. Therefore, the gain of current feedback control increases gradually according to the difference $\xi$. When the difference $\xi$ is large, quick follow-up properties can be ensured and when the difference $\xi$ is small, the optimal gain of current feedback control is selected to obtain high stability.

Embodiment 16

Figure 25:
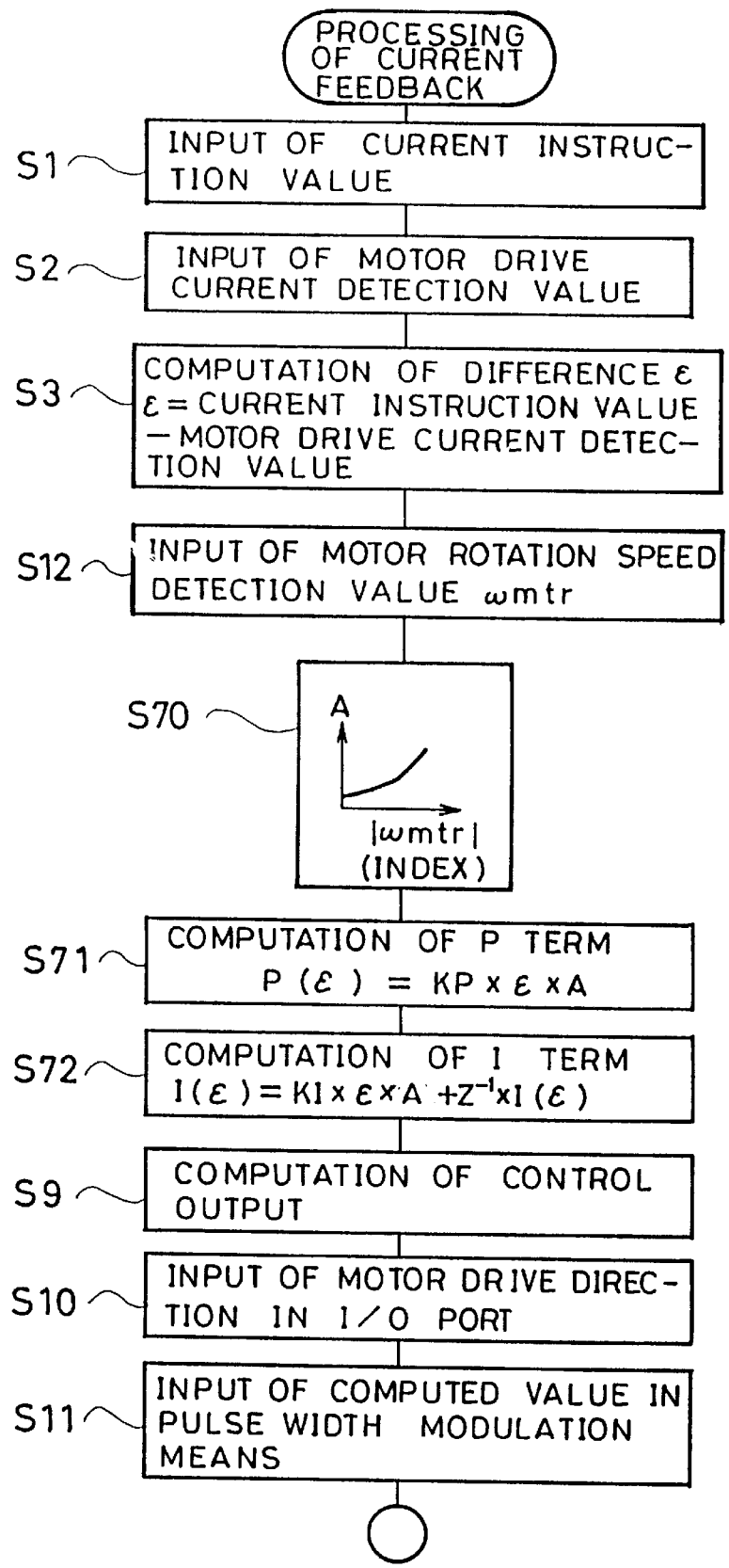
FIG. 25 is a flow chart of current feedback control of an electric power steering system according to Embodiment 16 of the present invention.

In Embodiment 15, the difference between the current instruction value and the motor current detection value is used as the index for setting an operation expression for current feedback control so that the gain of current feedback control is changed nonlinearly and gradually according to the difference. A factor other than the above difference may be used as the index for setting an operation expression. FIG. 25 is a flow chart of current feedback control in Embodiment 16. The flow chart of FIG. 25 differs from the flow chart of FIG. 24 in that step S12 is added to input a motor rotation speed detection value $\omega$mtr as the index for setting an operation expression, step S60 for the arithmetic processing of the correction operation expression A of step S60 is replaced by step S70, and steps S61 and S62 for the computations of P and I terms are replaced by steps S71 and S72, respectively. In step S70, the correction gain A is obtained with reference to feedback correction characteristics based on the absolute value $|\omega mtr|$ of the motor rotation speed detection value $\omega$mtr. In steps S71 and S72, the values of the P term and the I term are computed based on the difference $\xi$ and the correction gain A, respectively. Thus, the gain of current feedback control is automatically optimized based on the motor rotation speed detection value $\omega$mtr, thereby making it possible to ensure follow-up properties with ease when the steering speed is high and stability when the steering speed is low.

In Embodiment 16, the motor rotation speed detection value $\omega$mtr is used as the index for setting an operation expression. It is easily understood from the description of the above Embodiments 2 to 9 that the same effect can be obtained by using the steering speed detection value, back electromotive force, steering torque detection value, current instruction value, motor drive current detection value, differential value thereof or the car speed detection value as the index in place of the motor rotation speed detection value.

As described above, in the electric power steering system according to the first aspect of the present invention, the first operation expression is selected when the index for selecting an operation expression for current feedback control is larger than the first predetermined value, the second operation expression is selected when the index is smaller than the second predetermined value, and the difference between the current instruction value and the current detection value is corrected using the selected operation expression. Therefore, the index is properly selected according to the steering state of the steering wheel and response can be enhanced by making the gain of current feedback control large when the follow-up properties of current control are required as in the case of turning the steering wheel quickly. When stability of current control is required as in the case of holding the steering wheel, the gain of current feedback control is made small and the prevention of the oscillation of the output torque of the motor and the generation of control noise without the oscillation of current control with the resonance frequency of a mechanical system is realized without using an expensive controller having high-speed response.

In the electric power steering system according to the second aspect of the present invention, the first predetermined value and the second predetermined value to be compared with the index for selecting an operation expression are equal to each other. Therefore, the comparison of the index can be carried out simply and easily.

In the electric power steering system according to the third aspect of the present invention, the product of the difference between the current instruction value and the motor drive current detection value and the first correction gain is obtained from the first operation expression and the product of the difference between the current instruction value and the motor drive current detection value and the second correction gain is obtained from the second operation expression. Therefore, the first correction gain and the second correction gain can be independently selected so that the first correction gain lays stress on stability and the second correction gain lays stress on follow-up properties, and the optimal current feedback control is effected based on the index for switching an operation expression for current feedback control which changes according to the steering state.

In the electric power steering system according to the fourth aspect of the present invention, a timer is provided to judge the index, the operation expression used for computation is switched to the first or second operation expression based on the judgment result of the index, and then the first or second operation expression is retained for a time set by the timer. Therefore, hunting at the time of switching the feedback gain is prevented by selecting an appropriate time set by the timer and the follow-up properties of current control and the stability of stationary response can be ensured.

In the electric power steering system according to the fifth aspect of the present invention, a timer is provided to judge the index, the first operation expression is selected when the index is judged to be larger than the first predetermined value for a predetermined time set by the timer and the second operation expression is selected when the index is judged to be smaller than the second predetermined value for a predetermined time set by the timer. Therefore, hunting at the time of switching the gain of current feedback control is prevented by selecting an appropriate time set by the timer and the follow-up properties of current control and the stability of stationary response can be ensured.

In the electric power steering system according to the sixth aspect of the present invention, the difference between the current instruction value and the motor drive current detection value is represented by $\xi$, the first correction gain is represented by K1, the second correction gain is represented by K2 and the predetermined value for judging the index is represented by C, and ($\xi \times$K1) is used as the first operation expression when the absolute value of $\xi$ is smaller than the predetermined value C, and ($\xi \times$K2)–sign $\xi \times$C$\times$(K2–K1) is used as the second operation expression when the absolute value of $\xi$ is equal to or larger than the predetermined value C. Therefore, hunting can be prevented in such a control state that operations before and after the switching of the first operation expression and the second operation expression are continuous, and the follow-up properties of current control and the stability of stationary response can be ensured by suitably selecting the first operation expression or the second operation expression.

In the electric power steering system according to the seventh aspect of the present invention, the index for setting an operation expression for current feedback control is represented by I, a correction operation expression determined by the index I is represented by A(I), a controller for correcting the gain of current feedback control with A(I) is provided, and the correction operation expression A(I) includes a correction operation expression which satisfies dA(I)/dI$\geq$0. Therefore, when a change in steering force is small as in the case of holding the steering wheel, the gain of current feedback control can be made small to improve the stability of stationary response of current control. Since the gain of current feedback control increases gradually as the index I becomes larger, when the change in steering force is large, current feedback control which satisfies the follow-up properties of current control can be realized.

In the electric power steering system according to the eighth aspect of the present invention, since the absolute value of the difference between the current instruction value and the motor drive current detection value is used as the index, it is easy to judge the switching of an operation expression for current feedback control, and when the absolute value of the difference is small as in the case of turning and holding the steering wheel, the gain of current feedback control is made small to ensure stationary stability. When the absolute value of the difference is large, the gain of current feedback control is made large to ensure follow-up properties to a drive current.

In the electric power steering system according to the ninth aspect of the present invention, since the absolute value of the differential value of the current instruction value is used as the index, it is easy to judge the switching of an operation expression for current feedback control, and when the absolute value of the differential value is small as in the case of turning and holding the steering wheel, the gain of current feedback control is made small to ensure stationary stability. When the absolute value of the differential value is large, the gain of current feedback control is made large to ensure follow-up properties to a drive current.

In the electric power steering system according to the tenth aspect of the present invention, since the motor rotation speed is used as the index, it is easy to judge the switching of an operation expression for current feedback control, and when the motor rotation speed is small as in the case of turning and holding the steering wheel, the gain of current feedback control is made small to ensure stationary stability. When the motor rotation speed is large, the gain of current feedback control is made large to ensure follow-up properties to a drive current.

In the electric power steering system according to the eleventh aspect of the present invention, since the steering speed is used as the index, it is easy to judge the switching of an operation expression for current feedback control, and when the steering speed is small as in the case of turning and holding the steering wheel, the gain of current feedback control is made small to ensure stationary stability. When the steering speed is large, the gain of current feedback control is made large to ensure follow-up properties to a drive current.

In the electric power steering system according to the twelfth aspect of the present invention, since the back electromotive force of the motor is used as the index, it is easy to judge the switching of an operation expression for current feedback control, and when the back electromotive force is small as in the case of turning and holding the steering wheel, the gain of current feedback control is made small to ensure stationary stability. When the back electromotive force is large, the gain of current feedback control is made large to ensure follow-up properties to a drive current.

In the electric power steering system according to the thirteenth aspect of the present invention, since the absolute value of the differential value of the motor rotation speed is used as the index, it is easy to judge the switching of an operation expression for current feedback control, and when the absolute value of the differential value of the motor rotation speed is small as in the case of holding the steering wheel, the gain of current feedback control is made small to ensure stationary stability. When the absolute value of the differential value of the motor rotation speed is large, the gain of current feedback control is made large to ensure follow-up properties to a drive current.

In the electric power steering system according to the fourteenth aspect of the present invention, since the absolute value of the differential value of the steering speed is used as the index, it is easy to judge the switching of an operation expression for current feedback control, and when the absolute value of the differential value of the steering speed is small as in the case of holding the steering wheel, the gain of current feedback control is made small to ensure stationary stability. When the absolute value of the differential value of the steering speed is large, the gain of current feedback control is made large to ensure follow-up properties to a drive current.

In the electric power steering system according to the fifteenth aspect of the present invention, since the absolute value of the differential value of the back electromotive force of the motor is used as the index, it is easy to judge the switching of an operation expression for current feedback control, and when the absolute value of the differential value of the back electromotive force of the motor is small as in the case of holding the steering wheel, the gain of current feedback control is made small to ensure stationary stability. When the absolute value of the differential value of the back electromotive force of the motor is large, the gain of current feedback control is made large to ensure follow-up properties to a drive current.

In the electric power steering system according to the sixteenth aspect of the present invention, since the steering torque detection value is used as the index, it is easy to judge the switching of an operation expression for current feedback control, and when the steering torque detection value is large as in the case of holding the steering wheel, the gain of current feedback control is made small to ensure stationary stability. When the steering torque detection value is small, the gain of current feedback control is made large to ensure follow-up properties to a drive current.

In the electric power steering system according to the seventeenth aspect of the present invention, since the current instruction value is used as the index, it is easy to judge the switching of an operation expression for current feedback control, and when the current instruction value is large as in the case of holding the steering wheel, the gain of current feedback control is made small to ensure stationary stability. When the current instruction value is small, the gain of current feedback control is made large to ensure follow-up properties to a drive current.

In the electric power steering system according to the eighteenth aspect of the present invention, since the motor drive current detection value is used as the index, it is easy to judge the switching of an operation expression for current feedback control, and when the motor drive current detection value is large as in the case of holding the steering wheel, the gain of current feedback control is made small to ensure stationary stability. When the motor drive current detection value is small, the gain of current feedback control is made large to ensure follow-up properties to a drive current.

In the electric power steering system according to the nineteenth aspect of the present invention, since the car speed detection value is used as the index, it is easy to judge the switching of an operation expression for current feedback control, and when the car speed is low, the gain of current feedback control is made small to ensure stationary stability in the anticipation of a large output torque of the motor as in the case of turning the steering wheel while the vehicle is stopped. When the car speed is high, the gain of current feedback control is made large to ensure follow-up properties to a drive current.

In the electric power steering system according to the twentieth aspect of the present invention, since the main circuit drives the motor based on the output of the feedback controller and the gain of current feedback control is corrected to a correction gain which is specified based on a power voltage supplied to the main circuit, fluctuations in the gain of effective current feedback control caused by changes in battery voltage can be prevented and the gain of current feedback control is suitably set based on the judgment of a steering state to ensure both follow-up properties to a current instruction value and stationary stability the most advantageously.

What is claimed is:

1. An electric power steering system, wherein a difference between a current instruction value computed based on a steering state of a steering wheel and a traveling state of a vehicle and a motor drive current detection value supplied from a battery to a motor for providing assist force to a system for transmitting power from the steering wheel to the wheels is obtained, a first operation expression is selected when an absolute value of the difference is larger than a first predetermined value, a second operation expression is selected when the absolute value of the difference is smaller than a second predetermined value, the difference is corrected using the selected operation expressions and the current feedback control is carried out according to the corrected difference.

2. The electric power steering system of claim 1, wherein the first predetermined value and the second predetermined value are equal to each other.

3. The electric power steering system of claim 1, wherein the product of the difference between the current instruction value and the motor drive current detection value and a first correction gain is obtained in the first operation expression and the product of the difference between the current instruction value and the motor drive current detection value and a second correction gain is obtained in the second operation expression.

4. The electric power steering system of claim 1, wherein a timer is provided to judge the index, the operation expression used for computation is switched to a first or second operation expression based on the judgment result of the index, and then the first or second operation expression is retained for a time set by the timer.

5. The electric power steering system of claim 1, wherein a timer is provided to judge the index, the first operation expression is selected when the index is judged to be larger than the first predetermined value for a predetermined time set by the timer, and the second operation expression is selected when the index is judged to be smaller than the second predetermined value for a predetermined time set by the timer.

6. The electric power steering system of claim 1, wherein the difference between the current instruction value and the motor drive current detection value is represented by $\epsilon$, a first correction gain is represented by K1, a second correction gain is represented by K2, the predetermined value for judging the index is represented by C, ($\epsilon \times$K1) is used as the first operation expression when the absolute value of $\epsilon$ is smaller than the predetermined value C, and ($\xi \times$K2)–sign $\xi \times$C$\times$(K2–K1) is used as the second operation expression when the absolute value of $\epsilon$ is equal to or larger than the predetermined value C.

7. An electric power steering system for carrying out current feedback control by determining a difference between a current instruction value computed based on a steering state of a steering wheel and a traveling state of a vehicle and a motor drive current value supplied from a battery to a motor for providing assist force to a system for transmitting power from the steering wheel to the wheels, by determining a correction operation expression for correcting the gain for current feedback control system and carrying out current feedback control by correcting the gain of the current feedback control using the determined correction operation expression, wherein the difference is represented by I, a correction operation expression determined by this difference I is represented by A(I), and the correction operation expression A(I) satisfies $$\frac{dA(I)}{dI} \geq 0.$$

8. The electric power steering system of claim 1, wherein an absolute value of the difference between the current instruction value and the motor drive current detection value is used as the index.

9. The electric power steering system of claim 1, wherein an absolute value of the differential value of the current instruction value is used as the index.

10. The electric power steering system of claim 1, wherein the rotation speed of the motor is used as the index.

11. The electric power steering system of claim 1, wherein a steering speed is used as the index.

12. The electric power steering system of claim 1, wherein a back electromotive force of the motor is used as the index.

13. The electric power steering system of claim 1, wherein an absolute value of a differential value of the rotation speed of the motor is used as the index.

14. The electric power steering system of claim 1, wherein an absolute value of a differential value of a steering speed is used as the index.

15. The electric power steering system of claim 1, wherein an absolute value of a differential value of the back electromotive power of the motor is used as the index.

16. The electric power steering system of claim 1, wherein a steering torque detection value is used as the index.

17. The electric power steering system of claim 1, wherein the current instruction value is used as the index.

18. The electric power steering system of claim 1, wherein the motor drive current detection value is used as the index.

19. The electric power steering system of claim 1, wherein a car speed detection value is used as the index.

20. The electric power steering system of claim 1, wherein a main circuit drives the motor based on the output of a feedback controller, and the gain of current feedback control is corrected to a correction gain which is specified based on a power voltage supplied to the main circuit.

* * * * *